(12) United States Patent
Ramos et al.

(10) Patent No.: US 7,072,663 B2
(45) Date of Patent: Jul. 4, 2006

(54) RADIO RESOURCE MANAGEMENT

(75) Inventors: Gabriel Ramos, Málaga (ES); Matti Salmenkaita, Málaga (ES); Fabio Longoni, Campanillas (ES); François D'Argence, Espoo (FI); Timo Halonen, Espoo (FI); Juan Melero, Espoo (FI); Petter Hakalin, Benamadena (ES); Antti Tolli, Torremolinos (ES); Jose Antonio Cortes, Málaga (ES); Arto Kangas, Espoo (FI); Harri Holma, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/398,739

(22) PCT Filed: Oct. 9, 2001

(86) PCT No.: PCT/IB01/02220

§ 371 (c)(1),
(2), (4) Date: Sep. 22, 2003

(87) PCT Pub. No.: WO02/32179

PCT Pub. Date: Apr. 18, 2002

(65) Prior Publication Data

US 2004/0053630 A1  Mar. 18, 2004

(30) Foreign Application Priority Data

| Oct. 9, 2000 | (EP) | 0024705 |
| Nov. 10, 2000 | (EP) | 0027534 |
| Jun. 19, 2001 | (EP) | 0114965 |
| Jun. 20, 2001 | (EP) | 0115083 |

(51) Int. Cl.
*H04Q 7/20* (2006.01)

(52) U.S. Cl. ........................ 455/453; 455/436; 455/440

(58) Field of Classification Search ................ 455/453, 455/436, 440, 437, 444, 525; 370/331
See application file for complete search history.

(56) References Cited

U.S. PATENT DOCUMENTS

| 5,034,993 A | 7/1991 | Sasuta et al. |
| 5,530,917 A | 6/1996 | Andersson et al. |
| 5,828,963 A | 10/1998 | Grandhi et al. |

(Continued)

FOREIGN PATENT DOCUMENTS

EP  0 496 061 A2  7/1992

(Continued)

OTHER PUBLICATIONS

Inoue et al, "Performance Analysis of Microcellular Mobile Communication Systems", Vehicular Technology Conference, 1994 IEEE 44$^{th}$ Stockholm, Sweden, Jun. 8-10, 1994. pp. 135-139.

(Continued)

*Primary Examiner*—Melur Ramakrishnaiah
(74) *Attorney, Agent, or Firm*—Squire, Sanders & Dempsey L.L.P.

(57) ABSTRACT

A method for use in a network covering a region, said region comprising a plurality of areas, a user being assigned to at least oen of said area and having associated therewith a plurality of candidate areas to which the user may be assigned, said method comprising the steps of receiving information identifying said plurality of candidate areas; estimating for each candidate area a parameter, said parameter assuming that said user is assigned to said candidate area; and prioritising said plurality of candidate areas which takes into account the estimated value of said parameter.

46 Claims, 15 Drawing Sheets

U.S. PATENT DOCUMENTS

| | | | |
|---|---|---|---|
| 5,909,051 A * | 6/1999 | Stockman et al. | 257/610 |
| 6,078,817 A | 6/2000 | Rahman | |
| 6,278,701 B1 * | 8/2001 | Ayyagari et al. | 370/335 |
| 6,792,284 B1 * | 9/2004 | Dalsgaard et al. | 455/525 |

FOREIGN PATENT DOCUMENTS

| | | |
|---|---|---|
| WO | WO 96/06512 | 2/1996 |
| WO | WO 01/35692 A1 | 5/2001 |

OTHER PUBLICATIONS

Mende et al, "Mobile Radio Network Management Supported by a Planning Tool", Network Operations and Management Symposium, 1998, NOMS 98. IEEE New Orleans, LA, Feb. 15-20, 1998, pp. 483-492.

Rozenstrauch et al, "2 Phase RF Channel Allocation", Mar. 1, 1995, Motorola Technical Developments, vol. 24, pp. 70-71.

* cited by examiner

CRRM model for handover functionality

CRMS Alternative 1

- Cells belong to one CRMS
- CRMSes exchanges measurement information about border cells.

CRMS Alternative 2

- Cells can report to more than one CRMS
- Border cells are reporting to both CRMSes
- CRMS - CRMS interface not needed.

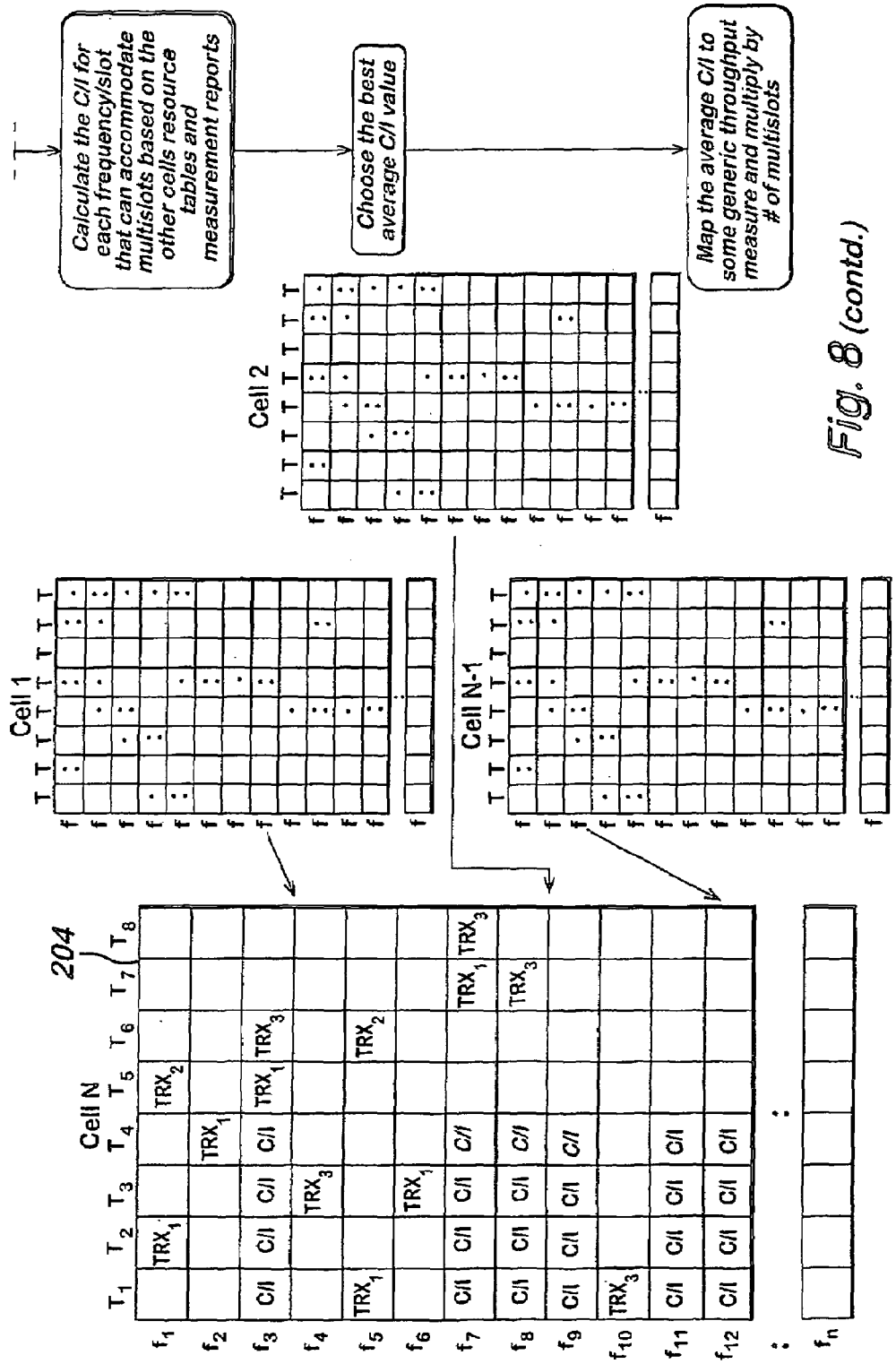
Fig. 8 (contd.)

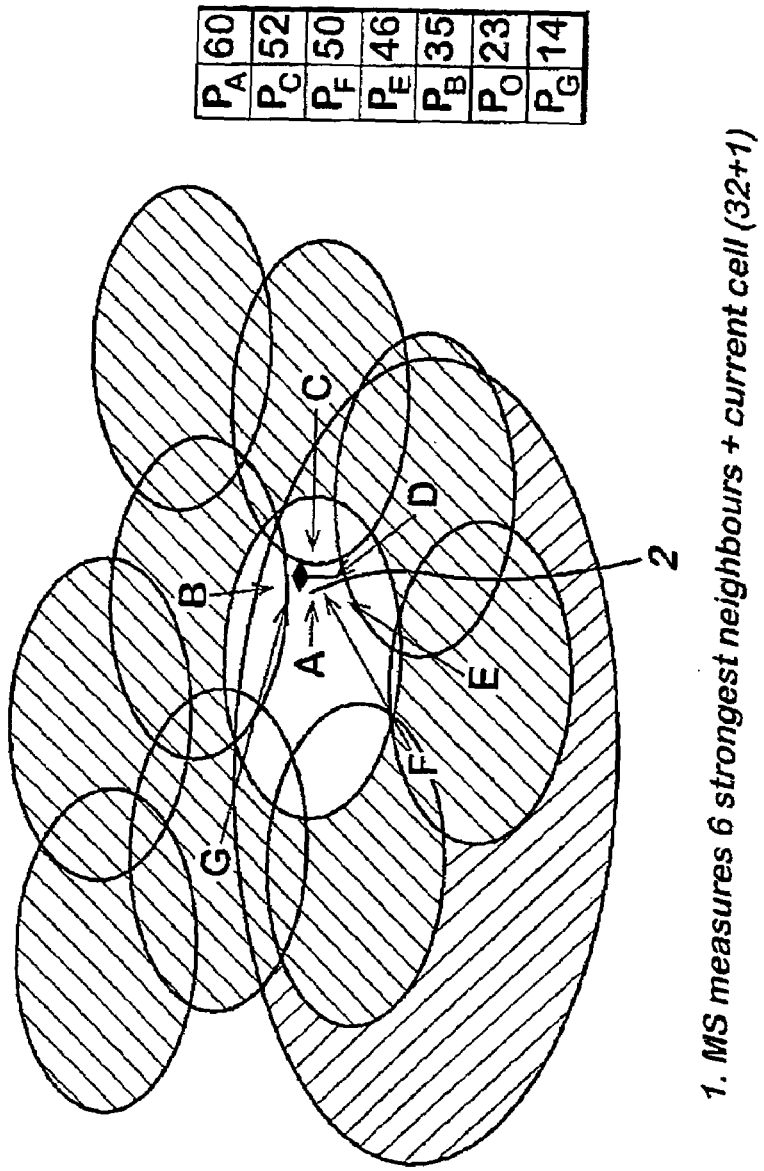

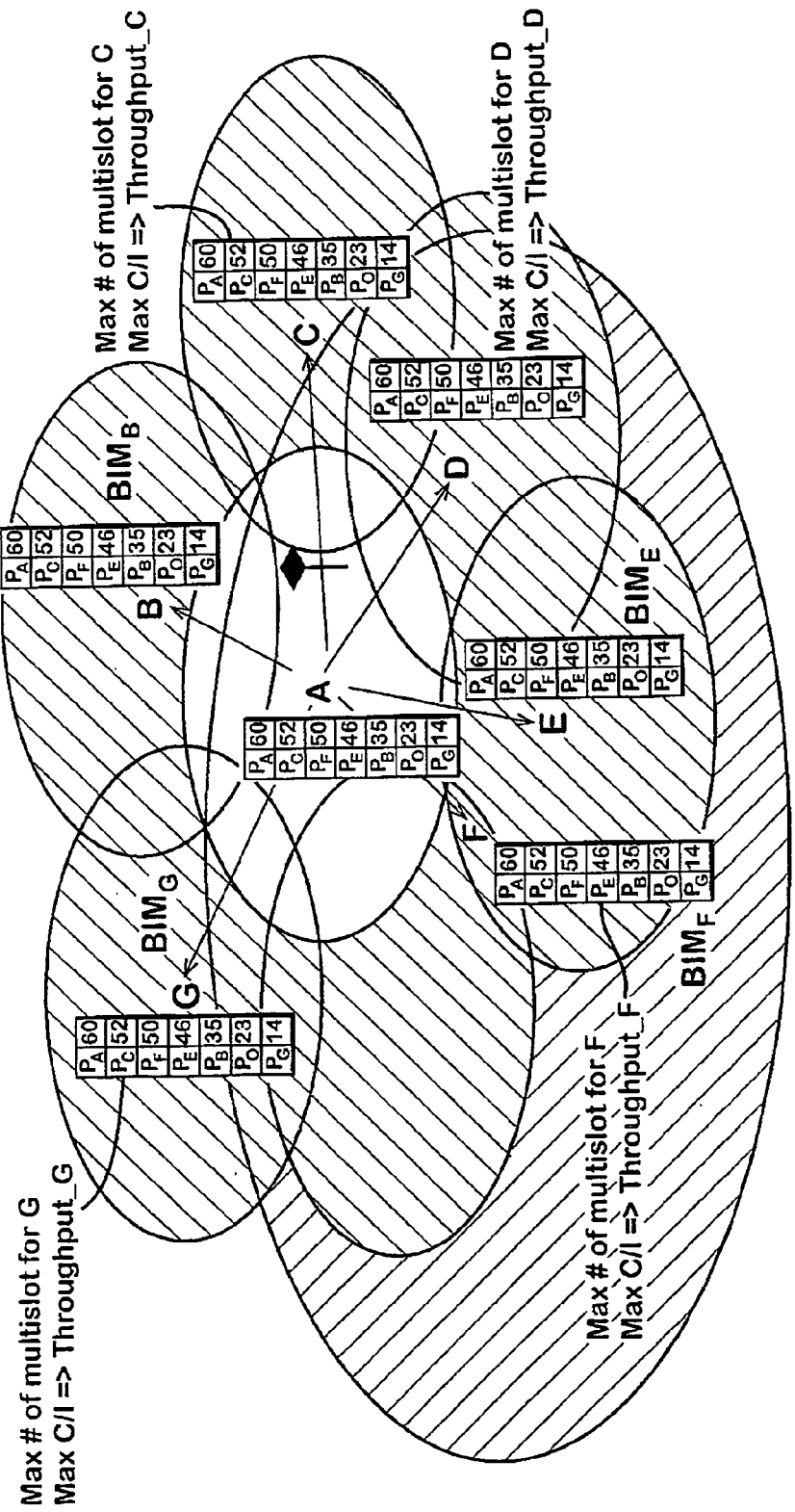

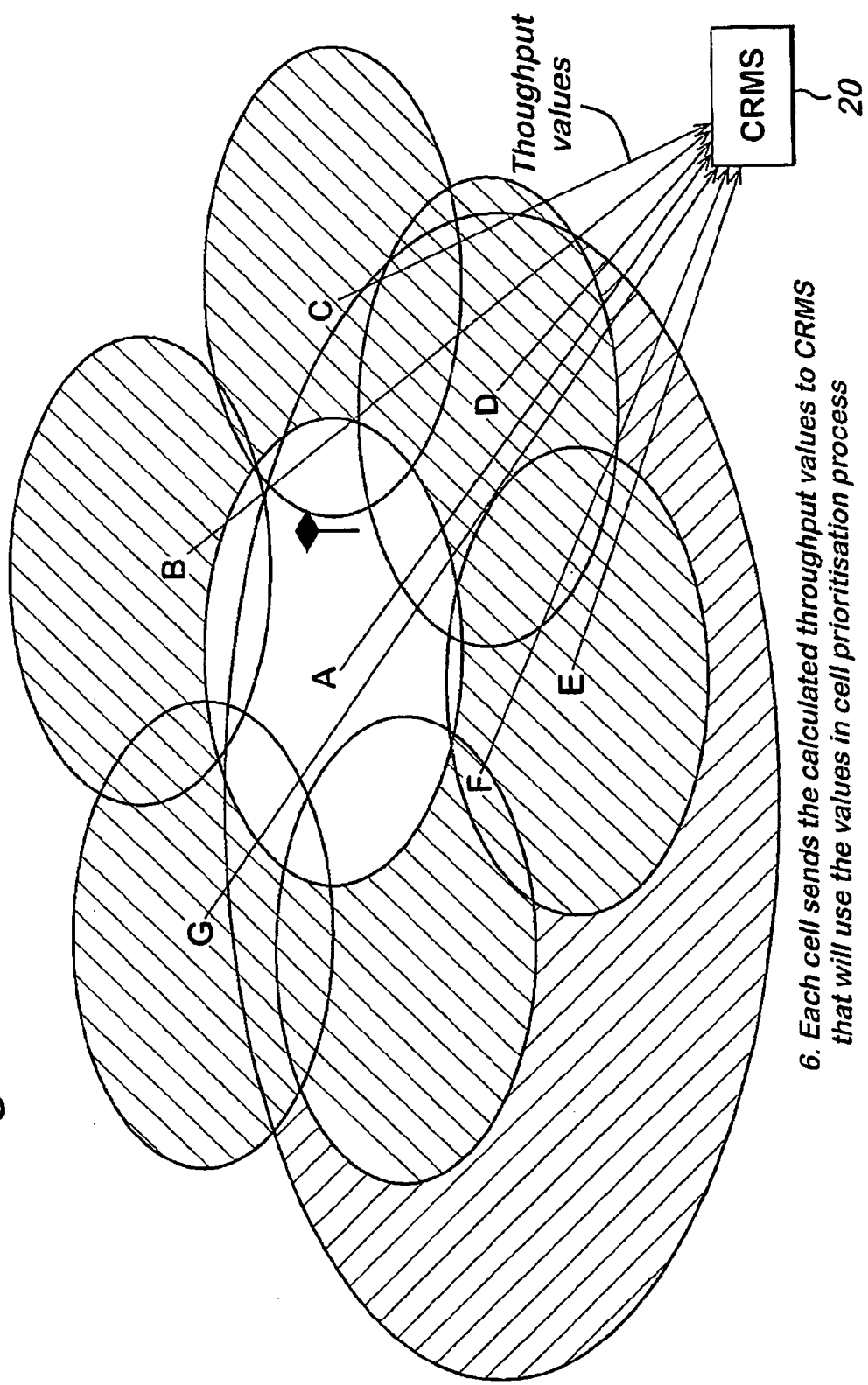
Fig. 10c Distributed throughput calculation with DFCA
6. Each cell sends the calculated throughput values to CRMS that will use the values in cell prioritisation process

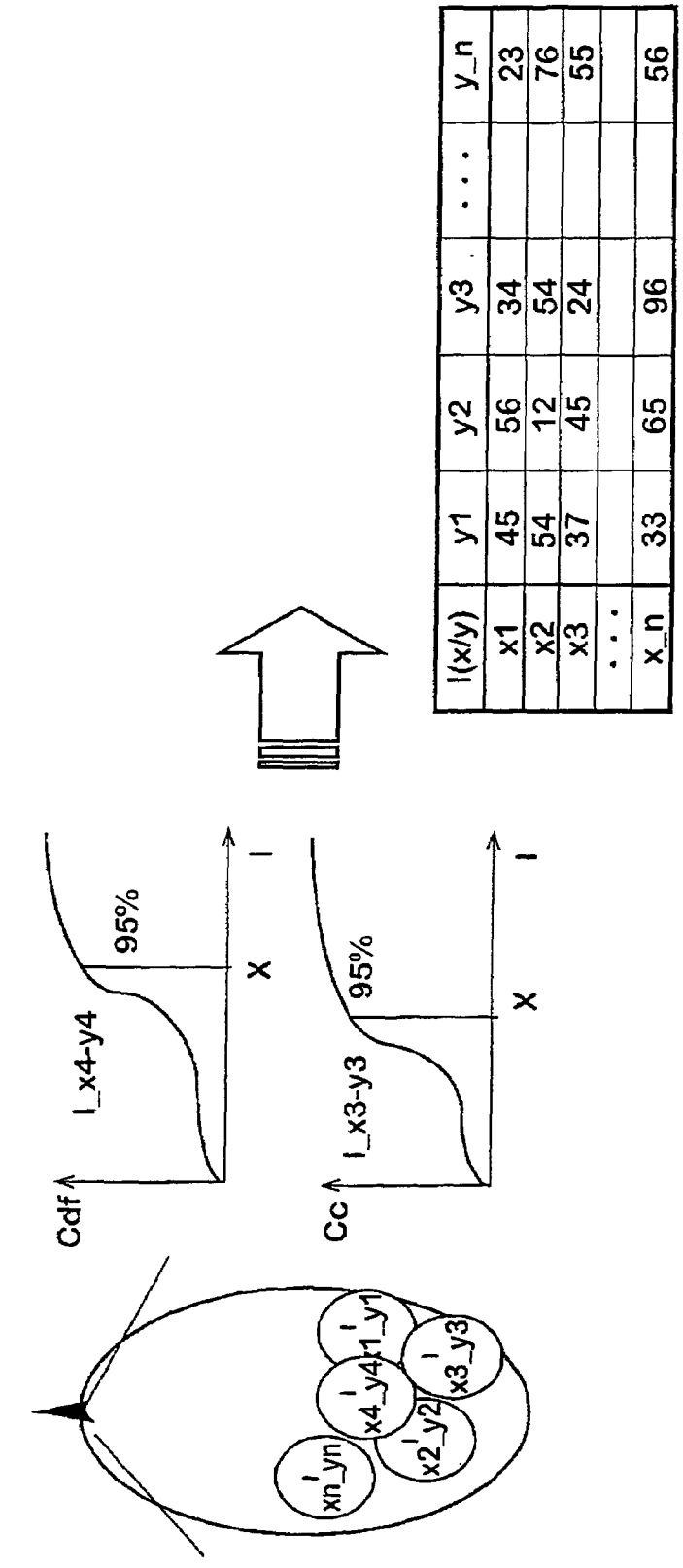

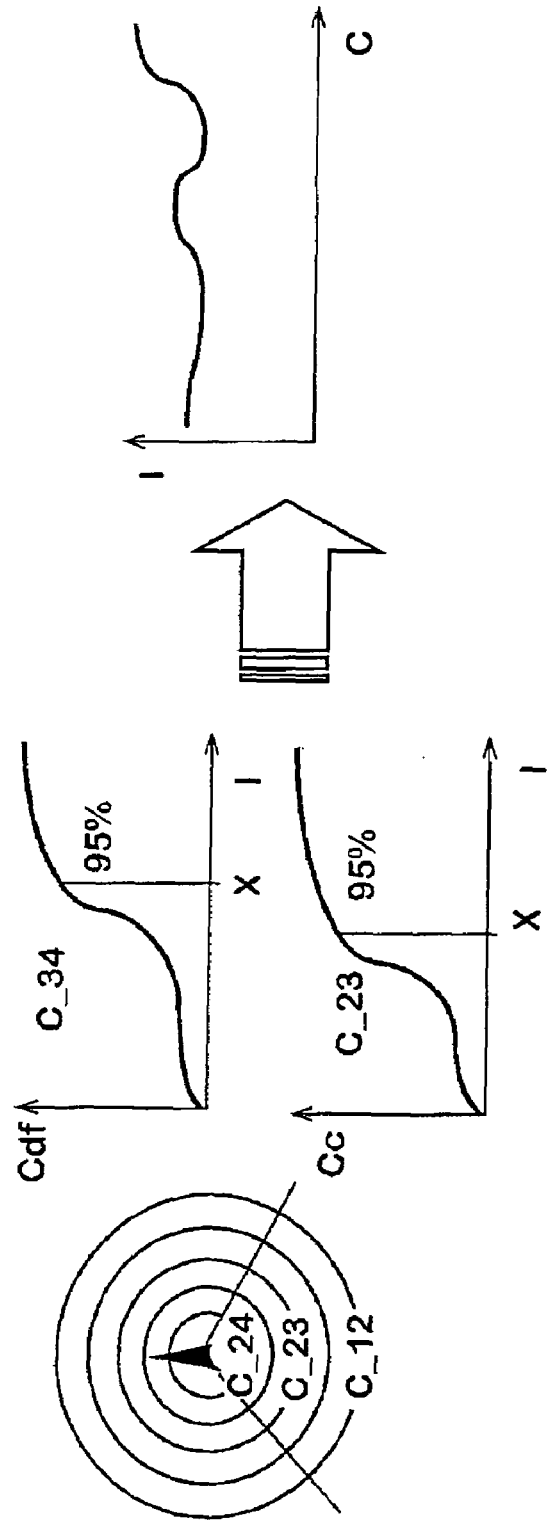

RADIO RESOURCE MANAGEMENT

FIELD OF THE INVENTION

The present invention relates to a radio resource manager and a method of radio resource management.

BACKGROUND OF THE INVENTION

It has been proposed that in the future wireless communications networks will consist of more than one radio access technology, such as WCDMA (wideband code division multiple access), GSM/EDGE (global system for mobile communication) or the like. By exploiting the different radio access technologies, the network as a whole can take advantage of the coverage and capacity characteristics of each technology. This can result in a more economic solution and provide the most appropriate radio bearers for a variety of different services.

In the known radio access networks the management of the radio resources between the systems is performed in a distributed way. The radio network controllers of the different systems manage the radio resources of each system independently. The efficiency of the resource management functions is limited by the area under the control of the radio resource controllers of the respective systems.

It has been appreciated by the inventors that in order to utilise the existing resources most efficiently, it will be necessary to manage the traffic within the different systems. The prior art arrangement with the resources being controlled by the radio network controllers of the respective systems is a particular problem with the making of handover decision between the systems. This is because the information that can be taken into account to perform the handover is limited to the resources under the control of each radio resource controller. Within a single system, the main limitation is the small amount of information that is possible to be exchanged between different radio resource controllers. This makes the management of the radio resources in the radio resource controller border areas difficult as the knowledge of the cells under control of the neighboring radio resource controller(s) is limited. In a multi-system environment the information available from the cells of another radio access system is even more restricted and there is no standardised way to check the status of a cell in another system. Moreover, if such an interface would be standardised between for example two known radio resource controllers, a new radio access system that could be introduced later would need separate interfaces to all relevant radio resource controllers.

An additional problem is that the separate operation and maintenance of multiple systems is not cost-efficient and could result in low resource usage and poor network quality.

In $3^{rd}$ generation wireless communications networks a large variety of different services can be provided to an end user. Contrary to existing $2^{nd}$ generation networks a continuous coverage or Quality of Service (QoS) cannot be guaranteed for all services everywhere in the cell because of higher signal-to-interference ratios demanded by high bit rate $3^{rd}$ generation services. If a cell to which a call is allocated, handed over or the like does not support the required quality of service, this may mean that the service in question cannot be supported or supported adequately.

SUMMARY OF THE INVENTION

It is an aim of embodiments of the present invention to address one or more of the problems discussed above.

According to one aspect of the invention there is provided a method for use in a network covering a region, said region comprising a plurality of areas, a user being assigned to at least one of said area and having associated therewith a plurality of candidate areas to which the user may be assigned, said method comprising the steps of receiving information identifying said plurality of candidate areas, estimating for each candidate area a parameter, said parameter assuming that said user is assigned to said candidate area, and prioritising said plurality of candidate areas which takes into account the estimated value of said parameter.

According to a further aspect of the invention there is provided a radio resource manager for use in a network covering a region, said region comprising a plurality of areas, a user being assigned to at least one of said area and having associated therewith a plurality of candidate areas to which the user may be assigned, said radio resource manager comprising means for receiving information identifying said plurality of candidate areas, means for estimating for each candidate area a parameter, said parameter assuming that said user is assigned to said candidate area, and means for prioritising said plurality of candidate areas which takes into account the estimated value of said parameter.

BRIEF DESCRIPTION OF THE DRAWINGS

For a better understanding of the invention and as to how the same may be carried into effect, reference will now be made by way of example only to the accompanying drawings in which:

FIGS. 10a–c illustrate a second method for determining throughput.

FIG. 12 illustrates a fourth method for determining throughput.

FIG. 13 shows a modification to the method illustrated in FIG. 12.

DESCRIPTION OF PREFERRED EMBODIMENTS OF THE PRESENT INVENTION

Figure 1:
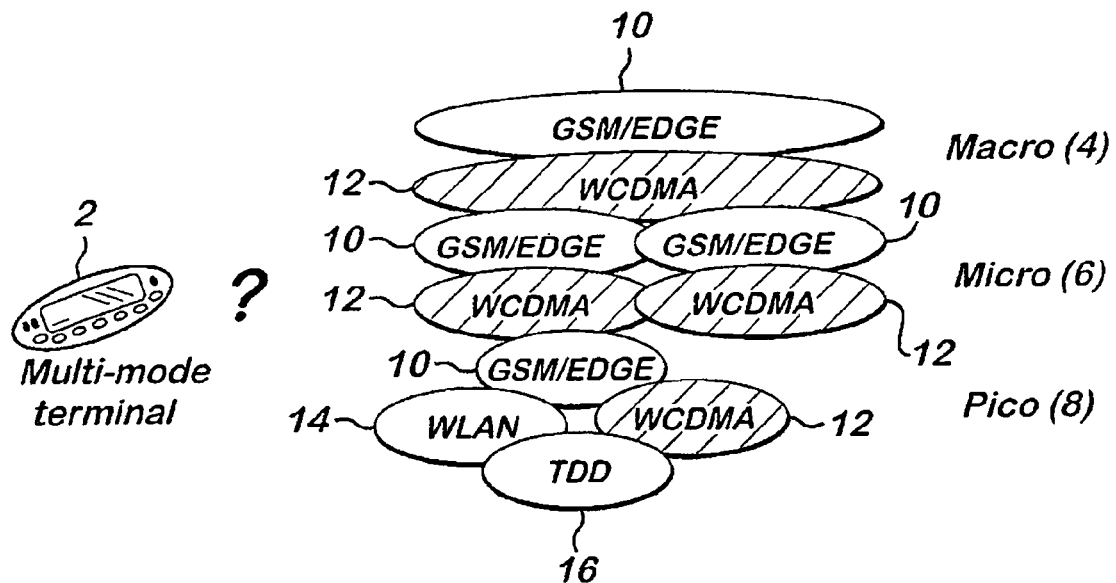
FIG. 1 shows a network comprising a plurality of different radio access technology systems.

Reference is made to FIG. 1 which shows a network comprising a plurality of different radio access technologies. A mobile station 2 or the like user equipment is able to use more than one radio access technology. It should be appreciated that the mobile station may in fact be stationary and may for example be a PC, personal digital assistant (PDA) or the like.

In the example shown, the radio access technologies are macro, micro or pico systems 4, 6 or 8 respectively. These different systems will have different sizes of cells with macro cells being much larger than pico cells. Usually the coverage area of one macro cell overlaps with several micro and/or pico cells. Different radio access technology systems can also be used within the macro, micro and pico systems. In the example shown, the different radio access technologies comprise GSM/EDGE 10, WCDMA 12, WLAN 14 (wireless local area network) or TDD 16 (time division duplex). It should be appreciated that this is by way of example only and any of the systems or radio access technologies can be omitted and/or any other suitable technologies or the like may be used in embodiments of the present invention.

The mobile station 2 is arranged to be able to communicate with different ones of these systems. In order to get the best out of the different resources, Common Radio Resource Management (CRRM) is provided to perform these tasks. The CRRM is provided by a server but in this document the entity providing the CRRM function will be referred to as a CRRM. This is described in relation to FIG. 2.

The CRRM 20 is provided by a server. It should be appreciated that whilst the CRRM function is described in this embodiment as being provided by a single entity, it is possible in alternative embodiments of the invention that a number of different entities may provide this same function. Those different entities may be part of the different systems. The Iur interface may be used with the distributed approach in order to exchange the necessary network element load information and/or any other information. The load information can be exchanged between the radio network controllers through the Iur interface. This interface is defined between radio network controllers. However it should be appreciated that the same or similar interface could be defined between for example radio network controller and base station controller interfaces and base station controller to base station controller interfaces.

Figure 2:
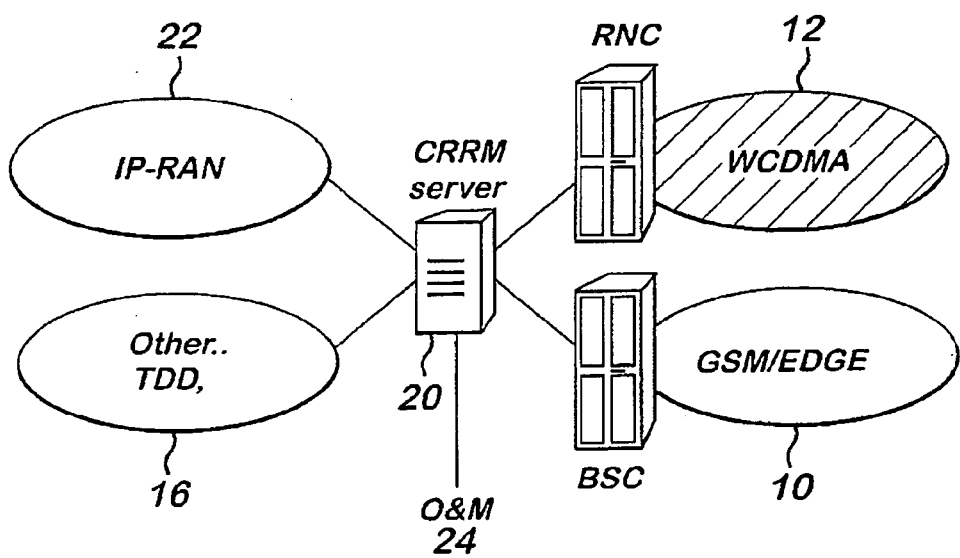
FIG. 2 shows a common radio resource management controlling a plurality of radio access systems.

The CRRM 20 is arranged to be connected to each of the different systems which, in the embodiment shown in FIG. 2, comprise a WCDMA system 12, a GSM/EDGE system 10, a TDD system 16 and IP RAN (internet protocol radio access network) system 22. The CRRM 20 also receives information from and sends information to the operation and maintenance entity 24 for the network as a whole.

The interfaces between CRRM 20 and different systems 10, 12, 16, 22 are preferably made from the elements which are handling radio resource management in those systems. These elements are radio network controller (RNC) in WCDMA networks, base station controller (BSC) in GSM/EDGE networks and cell resource servers (CRS) or some other radio resource controller in IP RAN networks. These elements are mentioned only as examples of the controllers and the term radio resource controller is intended to include all of these elements in this document.

The CRRM 20 is a policy manager which controls the access to the radio resources. As will be described in more detail hereinafter one of its tasks is the prioritization of the candidate target cells in handover and call setups. The main advantages of the CRRM 20 are:

Load sharing for efficient usage of resources

Interference distribution to provide higher spectral efficiency

Improved quality of service (QoS) management. With seamless integration of radio technologies based on QoS management the optimum end user performance can be achieved.

Since the characteristics of different radio access systems are generally quite different, a common language for signalling, handover algorithms, harmonized load indicators and the like should preferably be defined between the different systems and the entity(ies) in charge of common radio resource management functionality to avoid defining new interfaces if a new radio access system were to be used by network.

The cell prioritisation algorithm which can be used in CRRM to choose or assign the optimum target cell for connection in call setup, idle mode and in handovers/cell-reselections or the like will now be described.

In a mobile communication environment, when a mobile station that is holding up a connection goes out of a certain coverage area or the network has some other reasons for moving the mobile station to another cell, handover/cell-reselection is required. In the situation where more than one radio access technology and/or more than one service with different QoS requirements exist, the handover/cell-reselection decision (the decision if and to which cell the connection or connections should be handed over) is not as straightforward as in the case of the prior art mobile environment where just one radio access system exists and where the traffic consists mostly in speech services. Similar challenge exists in the call setup where the call is camping on the cell to which it was connected in idle mode.

In the latter case, the call setup candidates may be sent to the CRRM 20 which chooses the optimum cell for connection.

A load threshold may be used to trigger a directed retry, instead of using a directed retry only when the cell is fully congested. If reliable idle mode mobile measurements from available cells are known by the system before the signalling channel is allocated in the call setup, the call could be directed from the beginning to optimum cell.

The target cell selection in the CRRM 20 is based on a prioritization algorithm that will order the cells included in the candidate target cell list sent by the respective radio resource controllers of the different radio access systems to the CRRM 20. The candidate target cell list is then rearranged according to each cell's grade of suitability to hold on to the connection. Also some additional information, such as whether the handover/cell-reselection implies a change of radio access technology, location or routing area, may be taken into account. The reordered candidate cell list will be sent back to the radio resource controller, that will command the actual handover/cell-reselection process.

The method embodying the present invention enables the mobile station to be always connected to the most suitable cell by integrating the different radio access systems in such a way that the QoS requirements of the user connection(s) are fulfilled and the network performance is optimised in terms of spectral efficiency and trunking efficiency. In practice this may mean that 1) a higher number of users can be accepted (and/or or higher bit rates can be achieved) while maintaining the connection quality; 2) the number of dissatisfied users can be minimised; 3) handover/cell-reselection procedures can be more reliable while also minimising the unnecessary handovers/cell-reselections and 4) the usage of hardware resources within different radio access systems can be optimised.

Figure 3:
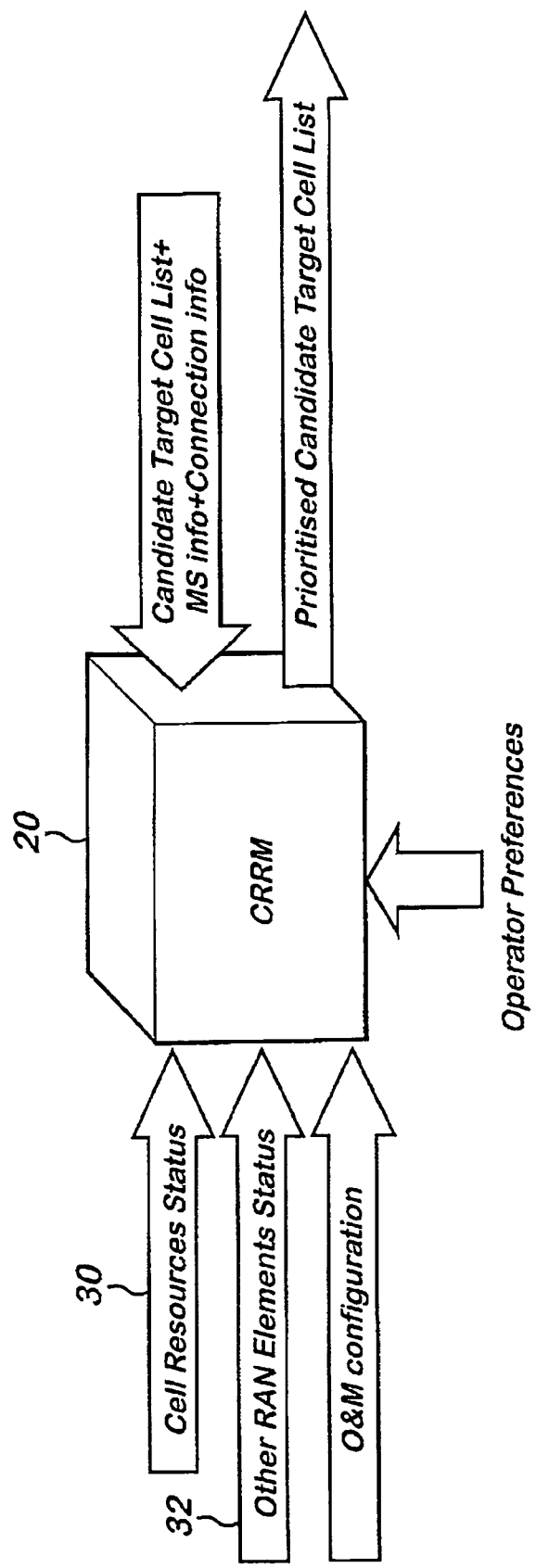
FIG. 3 shows the CRRM concept for handover functionality.

The process carried out by the CRRM 20 for the handover decision function is shown schematically in FIG. 3. The different inputs to the CRRM and which are used by the algorithms of the CRRM are described in a more details below.

The CRRM will receive periodically or on demand information about the status of cell resources 30. This information can contain for example:

1. Current traffic load of the cell. This information can be used to check whether the new connection is anticipated as introducing a high load to the target cell. The load information could be divided into:

Real Time (RT) load. The RT load could be simply measured as:
  Percentage of hardware (HW) utilisation (e.g. taking into account the baseband capacity, transmission capacity, digital signal processor (DSP) capacity, spreading code limitations in WCDMA etc.)
  In WCDMA, this could be the relationship between the transmission/reception (Tx/Rx) power used by the RT users measured by the system against the target Tx/Rx power. One or other of the uplink (Rx) and downlink (Tx) ratios or both of these could be sent.

Non-Real Time (NRT) load. NRT load could be measured by measuring the average delay of NRT users. The average delay should preferably be sent separately for each type of NRT traffic QoS class/priority combination. This would mean that the following average delays should be reported:
  Average delay experienced by interactive traffic class packet with traffic handling priority 1.
  Average delay experienced by interactive traffic class packet with traffic handling priority 2.
  Average delay experienced by interactive traffic class packet with traffic handling priority 3.
  Average delay experienced by background traffic class packet.

The reporting of these values could be the relationship of the average delay versus the retransmission time of higher layer (logical link control LLC) frames. Other options for reporting the delay could be:
  Average delay value (over different priority classes)
  Weighted average delay, where the weight could be related to scheduling priority of each priority class 2. Total load. Total HW utilisation of the cell, or in WCDMA the relationship between total Tx/Rx power measured by the system versus the target Tx/Rx power. Information on the uplink (Rx) or the downlink (Tx) or both of these could be sent to the CRRM.

3. Cell interference status. The cell interference statistics could be used to select the most suitable cell in terms of interference. For real time data services with guaranteed throughput this interference measurement could be used to estimate how much of the resources the new service is going to occupy in the target cell. In this way the CRRM could, when prioritising different cells in case of a real-time user, approximate the new real time and total loads of each candidate cell based on the above mentioned load and interference information.

The cell interference status could be sent for example in terms of:
  Carrier to interference ratio (C/I) with 95 percentage outage, meaning that 95% of the users in the cell are experiencing higher C/I than this value. Naturally any other outage value or statistical measure could also be used.
  Alternatively, the interference measurement could be, for example, bit error rate (BER) or bit error probability (BEP) outage (or other statistical measure of these).
  The interference value could also be mapped in the radio resource controller into a throughput value which could be then used for estimating the new real-time and total load of the candidate cells.

Another option to estimate the interference experienced by the user in the different candidate cells is to send an interference estimate per connection related to each candidate cell when an event such as directed retry (DR), handover, cell-reselection or the like has been triggered. DR means a facility in a cellular radio system allowing the mobile subscriber to make a second attempt at gaining access if the first attempt fails due to congestion.

Methods for estimating interference or potential throughput are described in more detail hereinafter.

The CRRM 20 can also receive periodically or on demand information 32 about the status of other radio access network (RAN) elements such as information related to loading of the gateways etc. To map the percentage cell load value to the actual number of available/reserved timeslots or to a particular transmission power, the CRRM needs to know the configuration information of the different cells and/or configuration information of different RAN elements. This configuration information should preferably include the cell capabilities. For example this would include information as to whether if a particular cell is supporting GPRS (general packet radio service) and/or EDGE (8-PSK modulation) in GSM. This information could be received for example from operation and maintainance entity of the network.

Apart from the configuration information, parameter values such as power-budget handover margins between different cells (GSM specific) for circuit switched (CS) and packet switched (PS) (or RT and NRT) connections should be known by the CRRM 20. The handover margin is related to the power budgets and it is used for avoiding the ping pong effect between adjacent areas.

Other information that can be used by CRRM 20 in prioritising candidate cells include:
  The received signal strength or link quality information (e.g. RxLev (received signal level) in GSM, received signal code power (RSCP) or energy per chip to interference ratio (Ec/I) in WCDMA) from the serving cell and the directed retry, direct access, handover or cell-reselection candidates prior to such event. This is an important (but not essential to all embodiments of the invention) input when selecting the optimum cell as this defines whether the mobile station is in the coverage area of particular cell candidate.
  Quality of Service (QoS) requirements of the connection. QoS requirements, such as a guaranteed throughput requirement should be taken into account when selecting the optimum cell. Throughput can be measured as number of bits (or data bits) transferred in one direction across a section per unit time (e.g. bps).
  Related to QoS requirements, the type of the traffic class(es) associated with the connection should be taken into account. There can be several packet data protocol (PDP)-contexts associated with one connection. In such cases, the target cell priorisation should preferably take into account all the associated contexts.

Any parameter relating to cell capability may be used in embodiments of the invention, for example the number of transceivers TRXs, target transmitted to received TX/RX power ratio, EDGE/GPRS capability, neighbour cell lists, or initial handover HO thresholds/margins or the like.

The CRRM 20 also receives information defining the candidate cell list, mobile station information and connection information 34. As will be described in more detail hereinafter, the CRRM uses the information which it receives to provide a revised candidate target cell list where the candidate cells are given a weighting or priority rating.

Figure 4:
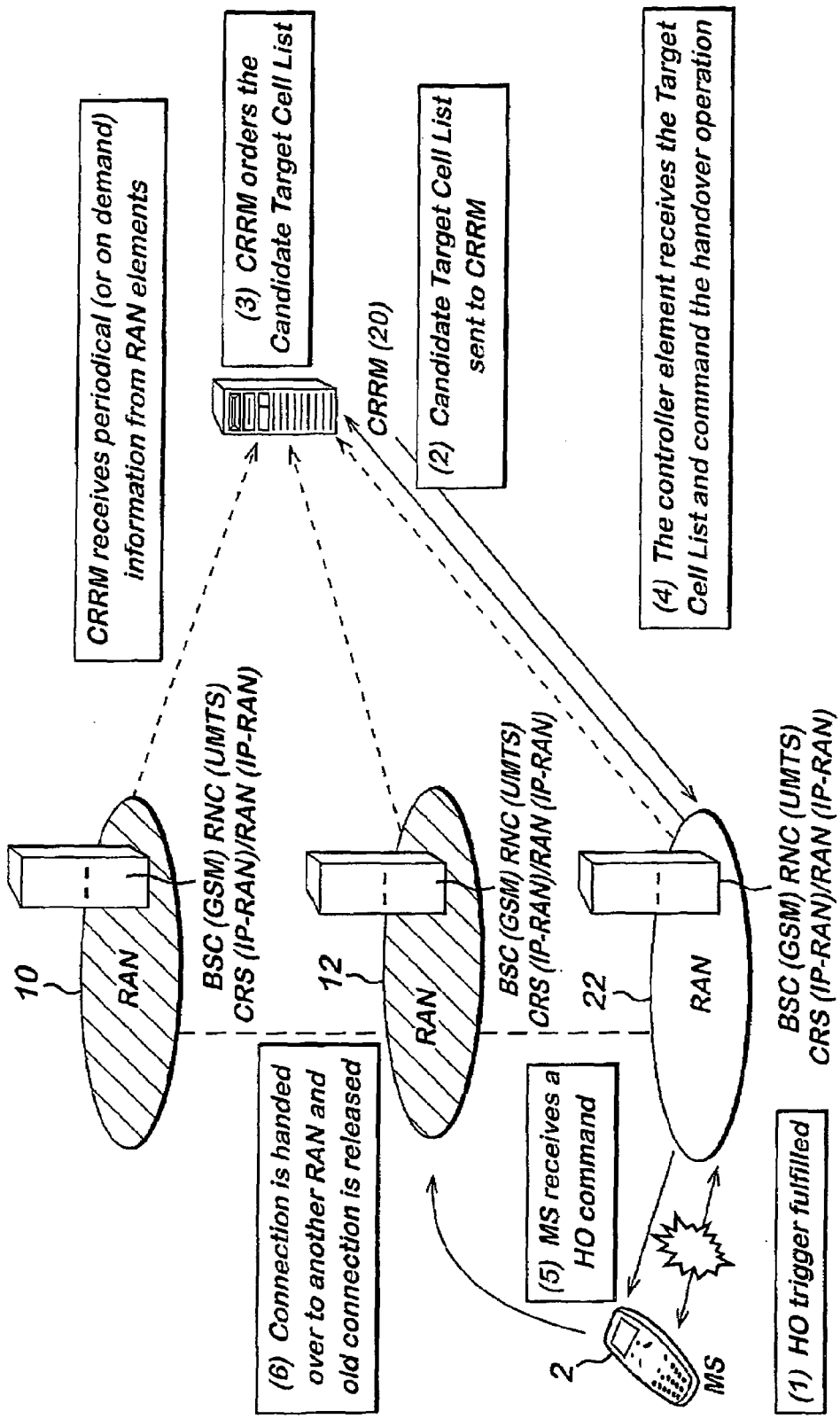
FIG. 4 shows the sequence of events during a handover process.

The method embodying the present invention will now be described with reference to FIG. 4 which illustrates a handover process.

Figure 5:
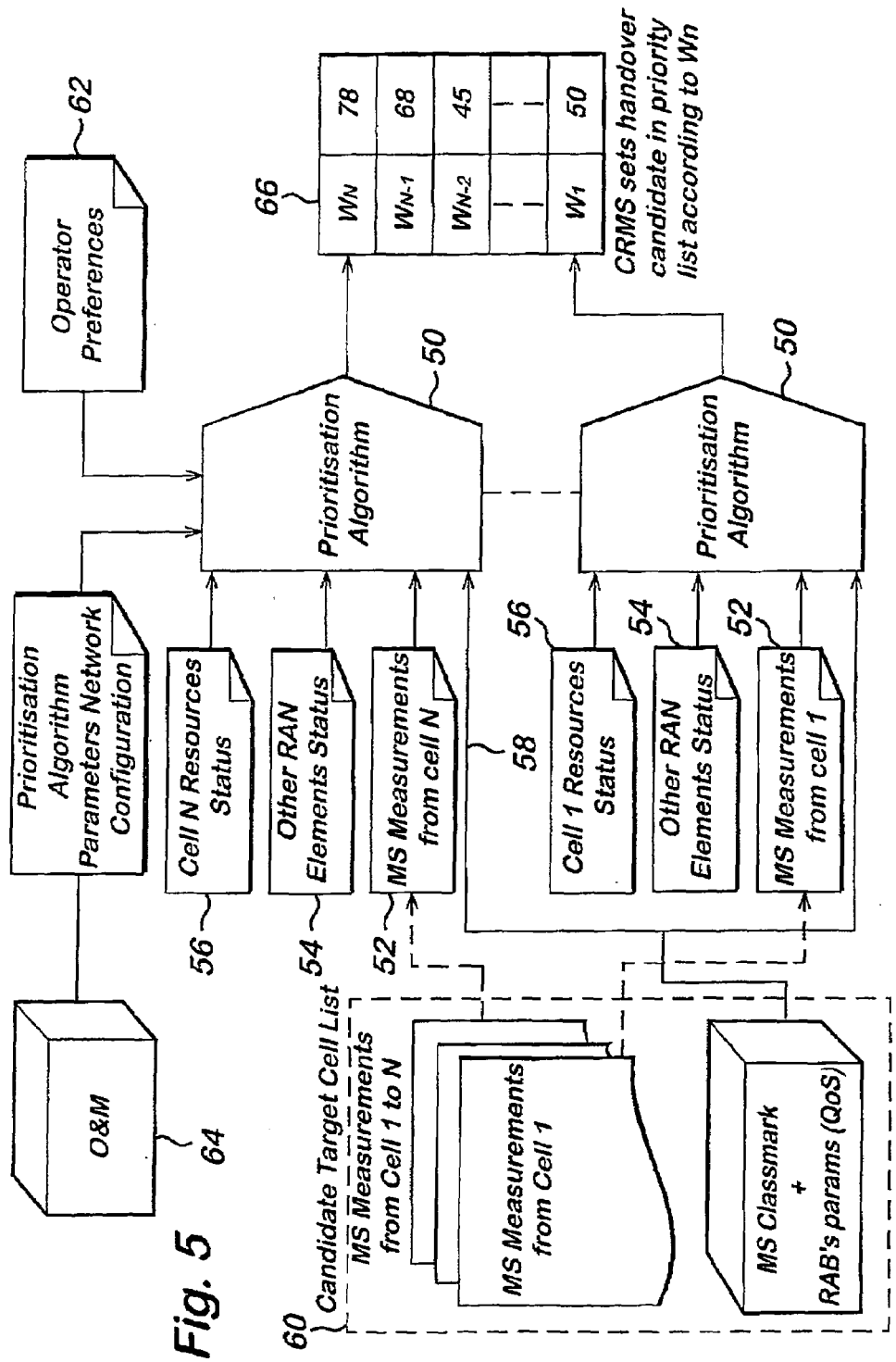
FIG. 5 illustrates the prioritisation algorithm of the handover decision.

Once the CRRM 20 receives the candidate target cell list it will give a priority value or weight to each cell included in this list. To calculate this priority value, the CRRM 20 uses an algorithm consisting of linear or nonlinear combination of its inputs, fuzzy logic, neural networks or any other procedure. An example of the prioritization algorithm is shown in FIG. 5. The priority Wn assigned to each cell which is a target cell for the handover is obtained, as said, as a function of numerous inputs:

Wn=f(Cell_Resources_Status, Other_RAN_Elements_Status, QoS_Requirements, MS_Measurements, MS_Classmark, O&M_Settings, Operator_Preferences)

In the candidate cell prioritizing, the current serving cell is also included in the candidate list. In this way the CRRM 20 can also prevent the directed retry, handover, cell-reselection or the like requested by radio resource controller if this is unnecessary or non-optimum.

The following steps are carried out. It should be appreciated that whilst the method is being performed the CRRM may be receiving the information discussed previously. In step 1, a handoff trigger is detected. This may be any of the conventional triggers in known communications systems. In step 2, the candidate target cell list is sent to the CRRM. The list is compiled from information received from the different radio access systems 10, 12 and 22. Only one radio resource controller reports the candidate list. The candidate cell list is based on the measurement report measured by the mobile station MS. The neighbour cell list in each radio resource controller includes the cells from the other systems as well. Otherwise they could not be measured by a user being connected to a cell that belongs to the given radio resource controller.

In step 3, the CRRM 20 orders the candidate target cell list, that is put them in the order of priority. This is done using the algorithm which will be described with reference to FIG. 5. In step 4, the CRRM 20 sends the ordered target cell list to the radio resource controller of the system having the cell with which the mobile station is currently associated. The radio resource controller then commands the handover operation based on the candidate cell list. In particular, the radio resource controller will select the cell with the highest priority. If that cell is not available for some reason, then the cell with the next highest priority is selected and so on.

In step 5, the mobile station receives a handover command from the radio network controller and in step 6 the connection is handed over to the new cell. That new cell may be in a different radio access system or the same system. The old connection will be released.

Reference is made to FIG. 5 which shows the prioritization algorithm. In the embodiment shown the algorithm is shown as having N parts 50 where N is the number of cells on a candidate cell list. Each part 50 receives the following information relating to the candidate cell which it is dealing with: the status of the cell, mobile station measurements from cell N 52, other RAN elements status 54 (such as discussed previously), and the status of the resources of cell N 56. The purpose of the prioritization algorithm is to provide a priority WN for the cell. The mobile station measurements as well as the identity of the candidate cells is provided by the candidate cell list 60. Additionally, the radio resource controller also provides for each part of the algorithm, via input 58, the mobile station classmark and radio access bearer parameters such as quality of service requirements and/or the like.

Each part of the algorithm 50 also receives operator preferences 62, and from the operation and maintenance part 64 of the network parameters for the algorithm and information relating to the network configuration. Based on the information received, each algorithm part calculates a priority or weight for each candidate cell. That information from the algorithm parts 50 is compiled into a list 66 which is sent to the radio resource controller.

It should be appreciated that the algorithm parts can perform any suitable algorithm using the received information. The skilled man would be able to devise such an algorithm.

It should be appreciated that in this document the term radio resource controller is intended to cover any entity in any access system which provides a control function within its radio access system. For example, this may be a base station controller (BSC) in a GSM/EDGE system, a radio network controller (RNC) in a CDMA system, cell resource server (CRS) in a IP RAN system or the like.

Emergency handovers such as rapid field drop handovers could be performed without consulting the CRRM 20 so as not to delay procedures.

As mentioned previously, the method of the invention could be implemented in centralised or distributed manner. With the distributed solution, each radio resource controller would be in charge of performing the cell prioritisation for the events that are triggered in the cells controlled by this particular radio resource controller. With the distributed solution, it is necessary to exchange network element status information from each radio resource controller to all neighbouring radio resource controllers. With the centralised CRRM solution, this signalling needs to be sent only from each radio resource controller to the to the corresponding CRRM(s).

Figure 6:
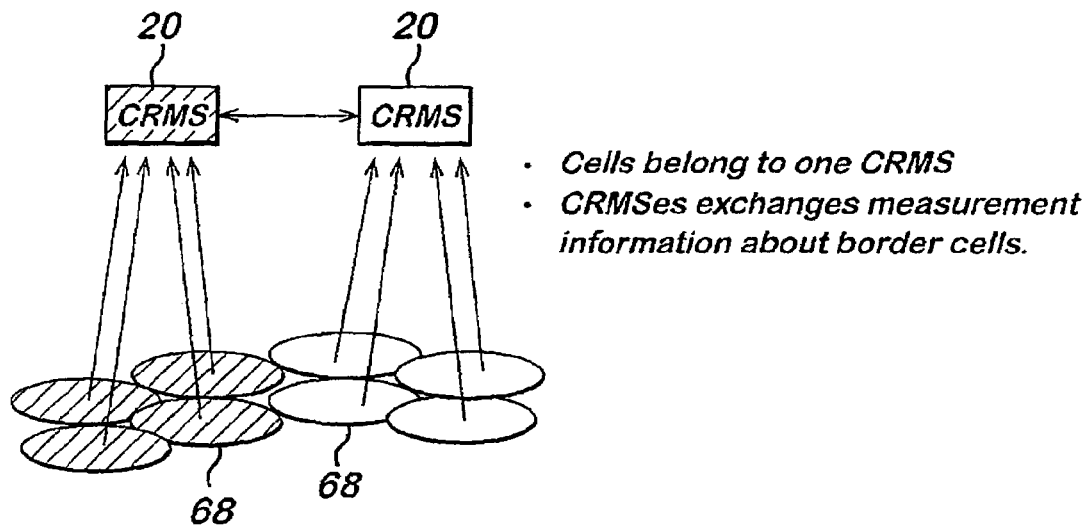
FIG. 6 illustrates one embodiment of the invention comprising a plurality of CRRMs.

If several CRRMs exist, the signalling between the CRRMs can be done in a similar way as in case of the distributed CRRM function. Reference is made to FIG. 6 which shows a network comprising two CRRMs 20 each of which controls a number of cells or areas 68. The CRRMs 20 are arranged to receive information from their cells or areas. The cells or areas are associated only with one CRRM. The CRRMs 20 are connected together to receive information from one another about border cells or areas.

The centralised CRRM could also be handling larger areas so that the radio resource controllers would send the load information and/or other information to the centralised CRRM from a particular "area" instead of cells. The CRRM would then only choose the best "area" and the radio resource controller could choose the best cell/resource within this area.

Figure 7:
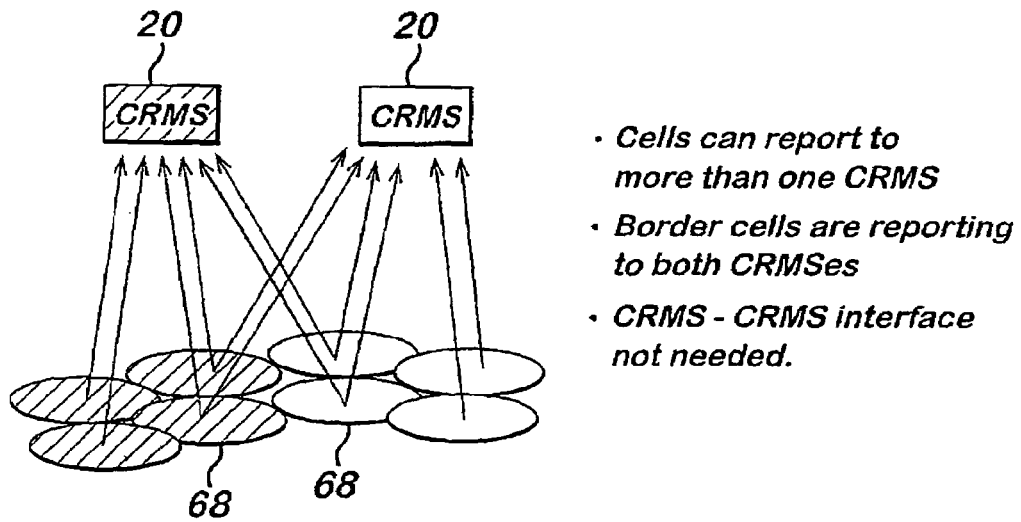
FIG. 7 illustrates a second embodiment of the invention comprising a plurality of CRRMs.

An alternative is shown in FIG. 7 where the radio resource controllers located in the CRRM border areas 68 send the cell status information to several CRRMs 20. Thus, border cells or areas are able to report to more than one CRRM and report to all the CRRMs which control adjacent areas or cells. The CRRM to CRRM interface is not required.

Preferred embodiments of the invention combine the arrangement of FIGS. 6 and 7 so that the cells or areas can report to more than one CRRM and the CRRMs can communicate with each other. This has the advantage that one or other of the options can be used. This may depend on the size of CRRM, the available transport capacity, the base station capacity or the like.

It should be appreciated that the different systems may cover adjacent or at least partially overlapping areas. Accordingly the term "border cell" should be construed accordingly to also include cells within a network which are adjacent or overlapping cells or a different system.

The CRRM 20 is arranged to be able to direct the incoming calls to the most relevant candidate cell according to its QoS requirements (for example Radio Access Bearer RAB parameters). Additionally for handovers or network controlled cell reselections, the capability of the candidate cells to support the requested QoS should be known. Among other parameters (e.g. traffic load, Rx level, operator priorities) the throughput should preferably be estimated for each cell, otherwise no QoS (required throughput) can be guaranteed before the selection of a new cell. The throughput is important to know especially for realtime (RT) services before the call setup or handover is proceed. Similarly, load increase is important to know in order to check if there is enough capacity left in a candidate cell, and also to take into account the capacity differences between cells.

A method to estimate the throughput in GSM/EDGE cells based on measurement reports and Dynamic Frequency and Channel Allocation (DFCA) will now be described.

The mobile station reports periodically the measurement reports from a number of neighbouring cells, for example 6 strongest or 32 in case of an extended measurement report, to its originating base station. Of course any suitable other number of cells may also be reported. The originating base station or radio resource controller calculates the throughputs of each of the candidate cells and provides this information to the CRRM. Analysis/estimation of the C/I ratio and the available slots (which is the throughput) is done at each time there is a channel allocation, i.e., handover, call setup or the like, using a DFCA one-way check. The throughput is defined based on the mobile station measurement reports and channel allocations in each candidate cells (achieved from DFCA reports between cells).

Additionally the background interference matrices (BIM) from each candidate cell can be used to get more accurate estimates. This requires the BIMs to be transmitted to originating cell.

The estimated C/I values per timeslot can be mapped to actual throughput values using mapping tables. The number of available timeslots is taken into account when maximum throughput value is defined.

Figure 8:
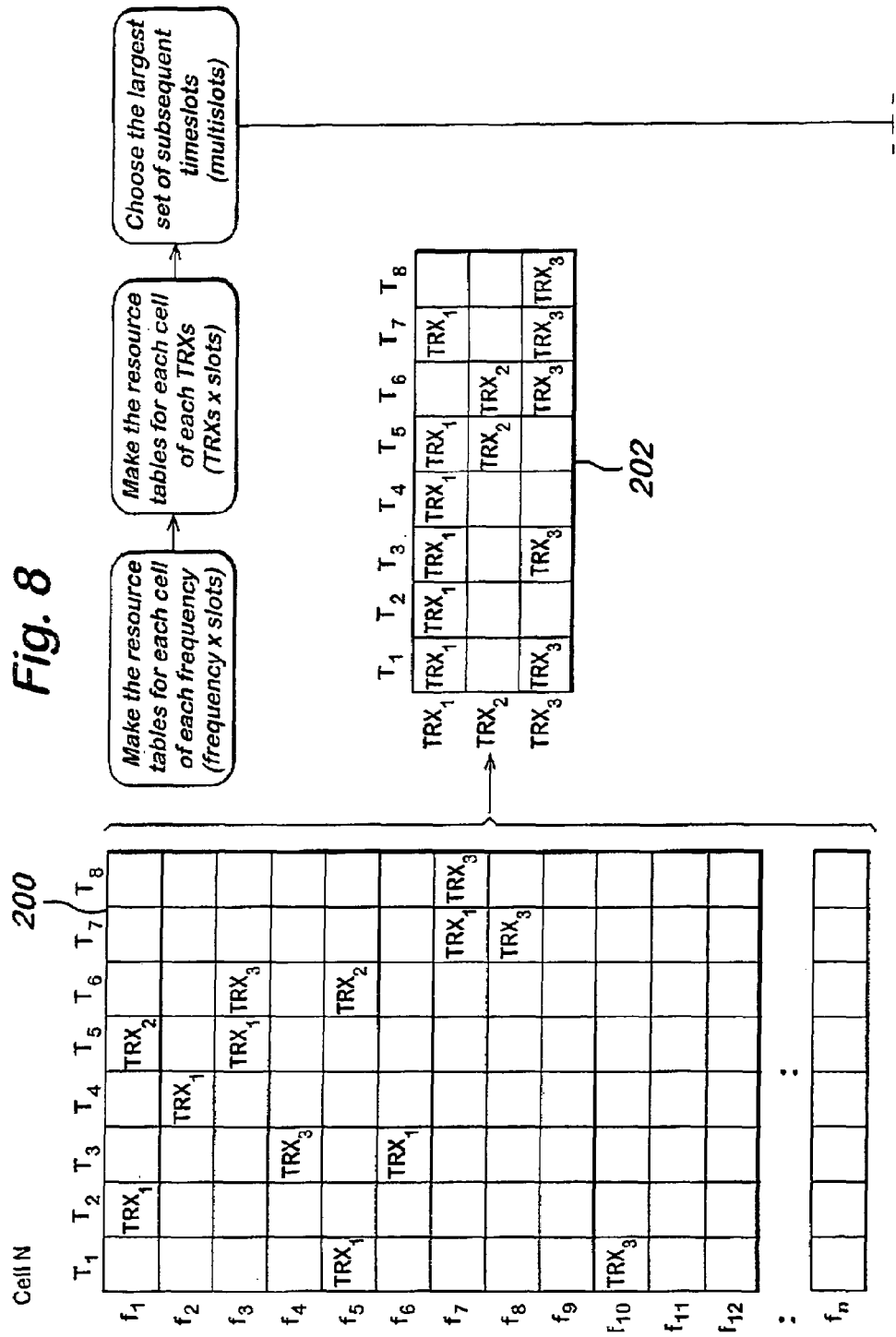
FIG. 8 illustrates a first method for determining throughput.
Figure 9:
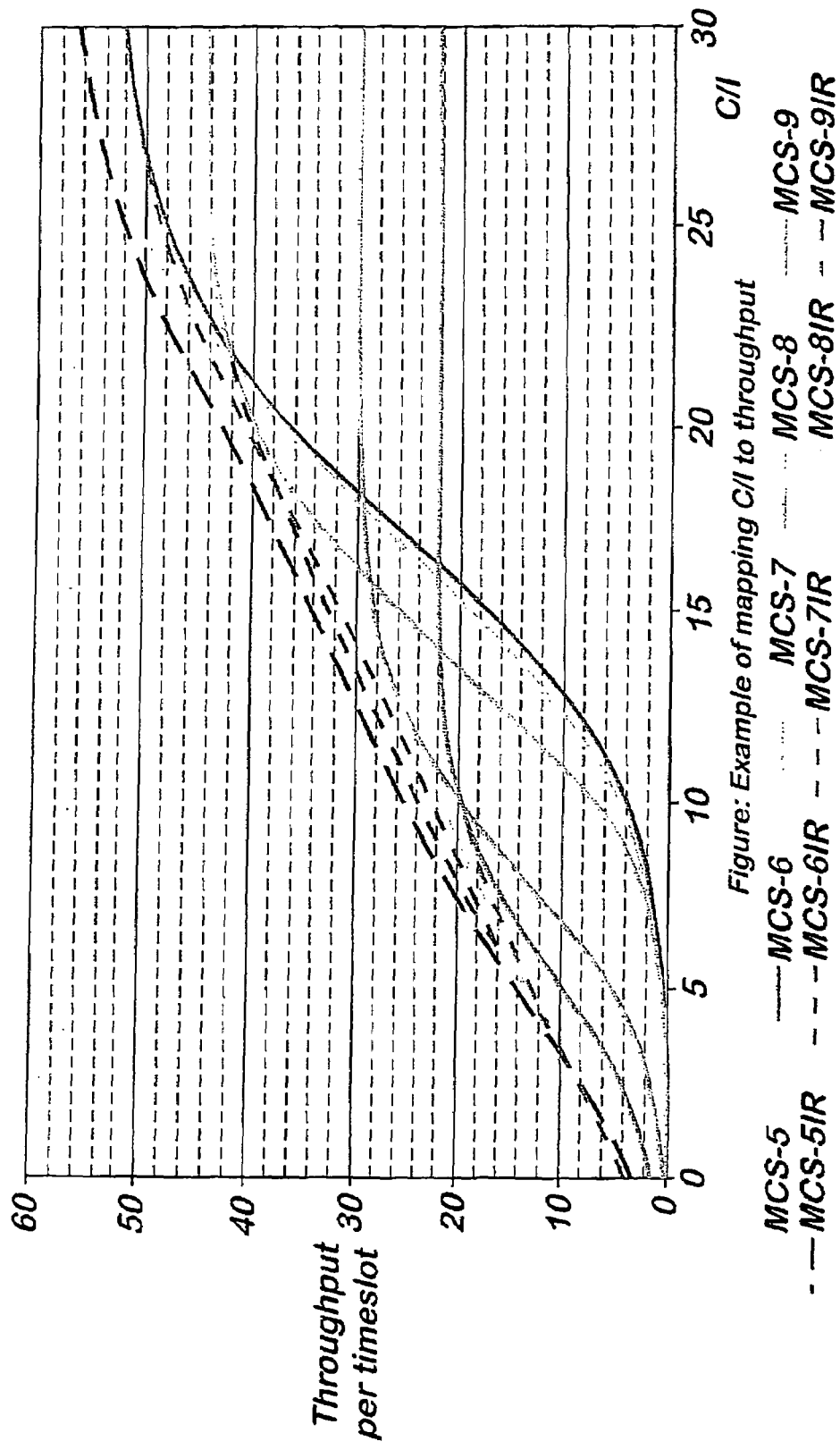
FIG. 9 illustrates the mapping of C/I ratios to throughput.

FIG. 8 illustrates the procedure of estimating the C/I based on MS measurement report and DFCA resource tables from other candidate cells. FIG. 9 illustrates how the C/I is mapped to actual throughput per timeslot.

The radio resource controller receives the measurement report from the mobile station including the received levels of each neighbouring cell (6 strongest neighbours and the signal level from current cell) Up to 32 strongest neighbours could be considered if an enhanced measurement report is used. The radio resource controller (which includes DFCA algorithms) receives also information about the current channel allocation of neighbouring cells (reserved timeslots per frequency) from table 200. Based on that information the serving radio resource controller makes a table 202 for each candidate cell of all the physical channels (timeslots/transmitters) showing all the available and occupied channels.

The serving radio resource controller (DFCA) can calculate C/I for each timeslot/frequency of each neighbouring cell. This procedure is the same as the DFCA one way check although no BIMs of neighbouring cells are used.

To calculate the C/I's only for the largest multislot group is not the only way to proceed. It should be noted that for example 3 slots with better average C/I can result higher throughput than 4 slots with worse C/I.

Accordingly, in addition to the largest multislot group the C/I values can be also calculated for one or more of the next best combinations of timeslots. It should be appreciated that this is only one method of calculating the C/I ratio and any other suitable method may alternatively be used.

Based on the average C/I and the maximum number of available slots (it is implementation issue whether the slots need to be sequential or not), the radio resource controller calculates a throughput measure for each candidate cell. This is sent to the CRRM. In addition, an average C/I per timeslot value can be sent to the CRRM. This can then be mapped to throughput per timeslot in the CRRM in accordance with FIG. 9.

Reference is made to FIG. 8 which shows the procedure for estimating the carrier to interference ratio based on the mobile station measurement reports and the DFCA resource tables from the other candidate cells. Firstly, in step 1, the resource tables 200 for each cell for each frequency are defined. The tables 200 have an entry for each frequency f and for each time slot T. Next, a table 202 is defined in step 2 which defines a resource table for each cell for each transmitter. In other words, the table includes information on each transmitter with respect to the available time slots. The first table 200 thus includes an entry for each frequency and time slot as to whether or not a transceiver is using that time slot on that frequency and, if so, the identity of that transceiver. If a given frequency and time slot are not being used, the table may be left blank or have any other suitable indication that the time slot on that frequency is available.

The second table 202 sets out for each transceiver, which time slot is being used by the respective transceivers.

In the third step, step 3, the largest set of subsequent time slots or multislots is selected. In the example shown in table 202, that would be timeslots $T_1$ to timeslot $T_4$.

In step 4, the carrier to interference ratio for each frequency and an associated slot that can accommodate the multislots is calculated. This is based on the other candidate cells resource tables and measurements reports. This is shown in the third table 204. As can be seen, the third table 204 is based on the first table 200 but includes calculated carrier to interference ratios for time slots $T_1$ to timeslot $T_4$ in selected ones of the frequencies. The frequencies which are selected are those which have all of the timeslots $T_1$ to $T_4$ empty. The information from the other cells, which is in a table similar to table 200 are used. The carrier to interference ratio is calculated using the following equation:

C/I=own cell (cell n) signal strength RxLev (C) divided by the average (decibels) or the worst (highest) value of measured levels (I) from other cell levels.

If any measured cell (n−1) have the same timeslot in use it should be considered as interference in cell n.

In step 5, the best average carrier to interference value is selected.

The average carrier to interference ratio can be mapped to a generic throughput measure and multiplied by the number of timeslots. This is done in step 6. In this regard, reference is made to FIG. 9 which gives an example of how the carrier to interference ratio can be mapped to throughput. In particular, FIG. 9 shows a graph with throughput per timeslot mapped against carrier to interference ratio.

FIG. 9 is showing different statistics gathered for different multi coding schemes. This graph can be used for estimation of the throughput when C/I is known. As can be seen from the graph, the greater the interference and noise the less the throughput (so another cell could be better). In more detail, FIG. 9 illustrates the link adaptation: the better C/I the less channel/error coding can be used and the better the throughput. The opposite is also true, the lower C/I the more robust the coding scheme that is required. This graph/table should be in CRRM or in radio resource controller.

This method can be used in any network where DFCA is used. However, in the prior art DFCA report from neighbouring cells, no information about transmitters is received. Therefore to use the embodiment of the present invention, some extra information is added to the DFCA reports from the neighbouring cells, namely the number of used transmitters for each frequency/slot and the total number of transmitters in each cell.

In this next embodiment a distributed method to estimate the throughput in GSM/EDGE cells based on measurement reports and Dynamic Frequency and Channel Allocation (DFCA) is described. FIGS. 10*a–c* show the procedure for estimating the C/I (maximum throughput) in each candidate cell based on the distributed mobile station measurement report and the DFCA resource tables of each candidate cell (and BIMs). As with the previous embodiment, FIG. 9 illustrates how the C/I is mapped to actual throughput per timeslot.

As shown in FIGS. 10*a–c* the following steps are carried out.

The mobile station measures the signal strength of a number of neighbouring cells, for example six or 32 strongest neighbour cells in the case of an extended measurement report, and the current cell. Of course in alternative embodiments of the invention, any other suitable number of measurements can be used. The mobile station reports periodically the measurement reports to its originating base station.

The originating base station utilises a DFCA one-way check, i.e., estimates the maximum throughput based on the measurement report and the DFCA background interference matrix (BIM).

The originating base station sends the measured values obtained in the previous step to each cell on the candidate list. The candidate cells estimate their maximum throughput based on the measurements and BIM's. This is done by each cell finding its largest set of possible time slot combination available (sequential multislots or scattered, depending on implementation). Each cell then calculates average C/I for those slot combinations using both measured values and BIM values (for cells not in the measurement report). The average estimated C/I values per timeslot are mapped to actual throughput per timeslot values using mapping tables. This can be done in the same way as described in relation to the previous embodiment. The number of available timeslots is taken into account when maximum throughput value is defined.

In some embodiments, the maximum throughput is needed only if the implementation requires subsequent timeslots. Otherwise the throughput per timeslot may be enough.

Each cell then sends the calculated throughput (per timeslot or C/I per timeslot) values to the CRRM that can use the values in cell prioritisation process This method can be used in any network where DFCA is used. The measurement report need to be multicast to other candidate cells and correspondingly estimated throughput values are forwarded to the CRRM 20.

A method to estimate the throughput and load increase in WCDMA cells is now described.

In handovers and call set-up all candidate cells can be prioritised by the CRRM as discussed above. For that purpose all cells report several indicators to the CRRM, such as traffic load and throughput. For low bit rate services such as speech services (e.g. 12.2 kbps) the measured load percentage values would be enough to differentiate the candidate cells even if there are capacity differences between them, but for higher bit rates (e.g. >50 kbps) capacity differences (Ptx_target downlink transmission power, number of transceivers etc) between cells have to be taken into account. For example, if there is a GSM candidate cell and a WCDMA candidate cell having same load percentage, but different maximum capacity it would be more desirable to handover to WCDMA (assuming that the other parameters/indicators included in prioritisation process do not impact this).

The WCDMA admission control algorithm is used for estimating required transmission power, that is, the load increase due to a new user in each WCDMA candidate cell. The required maximum power and mobile measurement report ($\rho_c = E_c/I_0$) can be then used to estimate available throughput in each cell, i.e. to check if the cell can support requested QoS.

It is assumed here that the downlink direction will limit the load and throughput due to the asymmetric nature of cell traffic. Accordingly only the downlink estimation is considered here. However, it could be desirable to estimate the uplink load as well, especially if most of the connections generate generally equal traffic in both directions. A similar technique can be used for uplink estimation.

Figure 11:
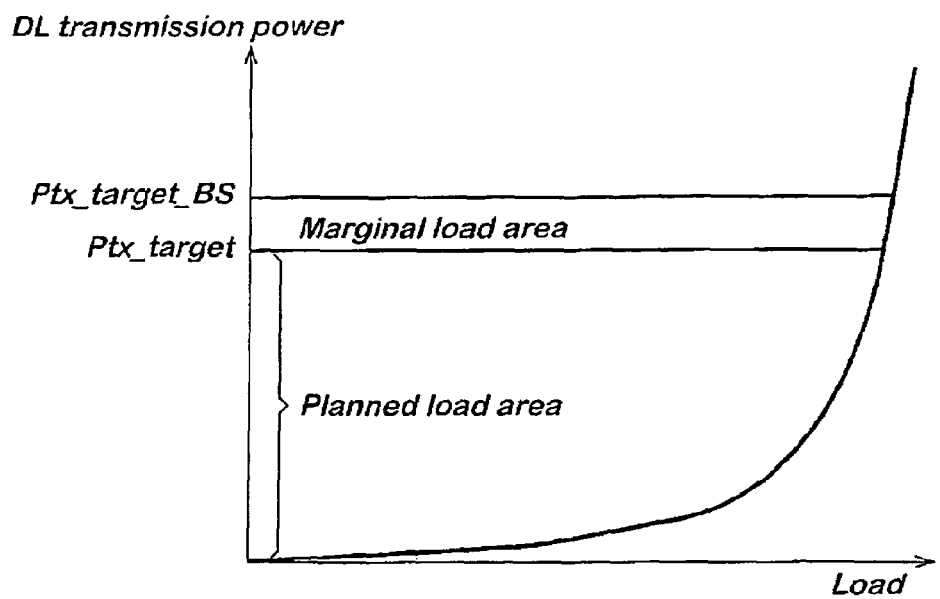
FIG. 11 shows a graph of downlink transmission power against load in a third method for determining throughput.

Reference is made to FIG. 11 which shows a graph of downlink transmission power against load. For each cell there is determined a threshold for maximum planned downlink transmission power, Ptx_target in FIG. 11. Ptx_target defines the optimal operating point of the cell load (100% target load), up to which the admission control of the radio resource controller can operate. When the non-controllable part, that is the realtime part of transmitted/received power which cannot be dynamically adjusted as NRT, of cell load exceeds the target limit, the admission control will reject at least those establishment requests, which will mean an immediate uplink UL load increase. Ptx_target is defined by the radio network planning RNP parameter PtxTarget.

The total transmission power Ptx_total can be expressed as the sum of the power caused by the non-controllable traffic, Ptx_nc, and the power caused by the controllable traffic of non-real-time users, Ptx_nrt $$P_{tx\_total} = P_{tx\_nc} + P_{tx\_nrt} \tag{1}$$

Hence, the load percentages for both total load (including both RT and NRT data) and RT load can be calculated in radio resource controller as follows:

$$\text{Load}_{Total\%} = 100 \cdot \frac{P_{tx\_total}}{P_{tx\_target}}, \quad \text{Load}_{RT\%} = 100 \cdot \frac{P_{tx\_nc}}{P_{tx\_target}} \tag{2}$$

For the RT radio access bearer RAB to be established, the increase of the non-controllable load ΔPtx_nc should be estimated in order to achieve an estimated load percentage including the requested RAB radio access bearer. Then the RT load percentage is:

$$\text{Load\_new}_{RT\%} = 100 \cdot \frac{P_{tx\_nc} + \Delta P_{tx\_nc}}{P_{tx\_target}} \quad (3)$$

The increase of the non-controllable load ΔPtx_nc can be estimated by determining the maximum downlink DL transmission power of the radio link. Consider a single service call with one radio access bearer RAB of the requested guaranteed bit rate $RI_{max}$ and the target $E_b/N_0 = \rho$ for it. If $P_{tx,ref}$ represents the maximum DL transmission power of a reference service (e.g., the 12.2 kbit/s speech service could be used as a reference service), $RI_{ref}$ its bit rate and $\rho_{ref}$ its target $E_b/N_0$ then the maximum power $P_{tx,max}$ for the radio link is determined from the $P_{tx,ref}$ by the equation (in linear form)

$$\Delta P_{tx} = P_{tx,max} = \text{MIN}(RI_{max,eff} \cdot P_{tx,ref}, P_{tx\_DPCH\_max}), \quad (4)$$

where the 'maximum effective bit rate correction factor' is defined by $$RI_{max,eff} = \frac{\rho \cdot RI_{max}}{\rho_{ref} \cdot RI_{ref}} \quad (5)$$

where $P_{tx\_DPCH\_max}$ is the absolute maximum for the DL DPCH (dedicated physical channel) code channel transmission power determined by the parameter PtxDPCHMax.

As the maximum downlink DL transmission power for the requested radio access bearer RAB is defined, it can be used to check or estimate the maximum bit rate Rmax (=throughput) that can be achieved with given transmission power $P_{tx,max}$. For this purpose 'the initial DL transmission power' formula $$P_{tx} = \frac{\rho R}{W} \cdot \left( \frac{1}{\rho_c} \cdot P_{tx,CPICH} - \alpha \cdot P_{tx\_total} \right). \quad (6)$$

can be modified. The determination of the transmission power requires knowledge about several parameter values. They are obtained as follows.

ρ=$E_b/N_0$ is energy-per-bit-per-noise-density for requested bit rate $\rho_c=E_c/I_0$ is the signal-to-interference ratio per chip of the perch channel measured by the terminal (MS measurement report).

W is the chip rate (3.84 Mchips).

R is the bit rate, specified by the network.

Ptx_total is measured by the base station.

Ptx,CPICH is a radio network planning parameter to determine the transmission power of the Primary CPICH (common pilot channel). α is difficult to determine since it depends on diverse factors that may change rapidly. Preliminary, it might be fixed to 0.5.

Instead of solving initial transmission power for known bit rate R, the maximum achievable bit rate $R_{max}$ with knowledge of maximum transmission power $P_{tx,max}$ is determined as follows:

$$R_{max} = \frac{P_{tx,max} \cdot W}{\rho \cdot \left( \frac{1}{\rho_c} \cdot P_{tx,CPICH} - \alpha \cdot P_{tx\_total} \right)} = \text{Throughput} \quad (7)$$

The implementation of this embodiment, as with the previous embodiments, can be distributed or centralised. In the distributed version the required MS measurement report values are sent to candidate cells, which in turn calculate the throughput and load increase and forward them to CRRM. In a centralised version the MS measurement report is sent directly to CRRM where throughput and load increase are calculated. In this case some cell specific radio network planning (RNP) parameters are also needed by the CRRM, including $RI_{ref}$, $\rho_{ref}$ (target $E_b/N_0$), $P_{tx,ref}$, $P_{tx\_DPCH\_max}$, α, and $E_b/N_0$ table for different data rates, and they should be kept in database within the CRRM server and updated from cells if they are changed.

Figure 14:
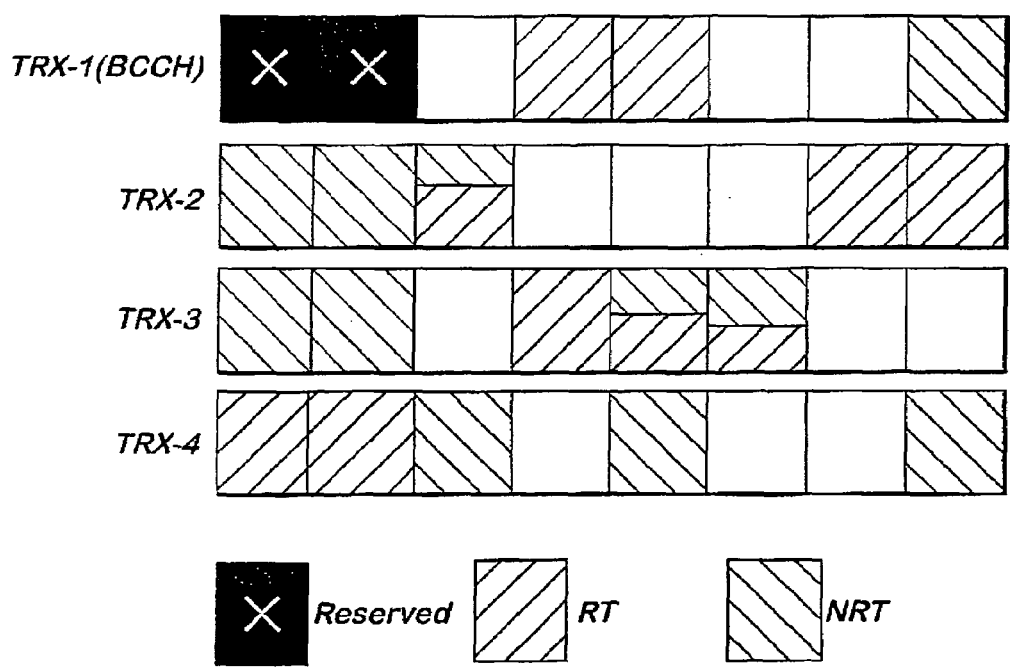
FIG. 14 shows an GSM cell load.

In the following, a similar load increase estimation method for GSM cell is described, with reference to FIG. 14.

In an example of the load in a GSM cell is illustrated. A time slot can be fully dedicated to RT/NRT traffic or shared between different traffic classes. For a real time user the total guaranteed bandwidth is considered, summing every guaranteed piece of bandwidth together. The NRT load does not have importance for a RT user, since it can be flexibly controlled by packet scheduler.

Each GSM cell has certain number of time, slots ($TSL_{max}$) to be used for user data, depending on the number of transceivers TRXs in cell and the reserved slots. The total load consists of RT and NRT data:

$$TSL_{total} = TSL_{RT} + TSL_{NRT}$$

Hence, the load percentages for both total load (including both RT and NRT data, both dedicated and shared time slots) and RT load can be calculated in radio resource controller as follows:

$$\text{Load}_{Total\%} = 100 \cdot \frac{TSL_{total}}{TSL_{max}}, \text{Load}_{RT\%} = 100 \cdot \frac{TSL_{RT}}{TSL_{max}} \quad (2)$$

For the RT RAB to be established with bit rate requirement $R_{req}$ the available throughput per timeslot $R_{est,tsl}$ (based on mobile measurements and BTS statistics) should be estimated in order to estimate new load percentage including the requested RAB. Then the RT load percentage could be approximated as:

$$\text{Load\_new}_{RT\%} = 100 \cdot \frac{TSL_{RT} \cdot R_{est,tsl} + R_{req}}{TSL_{max} \cdot R_{est,tsl}} = \frac{TSL_{RT} + TSL_{est}}{TSL_{max}} \quad (3)$$

For example: current Load_RT=60%, TSLmax=30, throughput per TSL=25 kbps, requested service=64 kbps $$\text{Load\_new}_{RT\%} = 100 \cdot \frac{18 \cdot 25 \text{ kbps} + 64 \text{ kbps}}{30 \cdot 25 \text{ kbps}} = 68.5\%,$$

the service would need at least multislot of 3 TSL's.

This does not mean that three time slots would be allocated to the service, but it would give rough estimate about the load increase due to new user.

The throughput estimation may be done on a cell basis, i.e., collecting statistics of the whole cell area, and using some safe 95% guess of available throughput per timeslot. Alternatively, the 'real' connection-based maximum throughput for a given user in each candidate cell based on mobile measurements and BTS statistics could be estimated. The estimation could be done for example by using existing DFCA algorithms in each candidate cells. This may require some additional signalling between cells.

In the next embodiment, a method to estimate the throughput in GSM/EDGE cells based on cell interference statistics, mobile station location and the mobile station's measurement report is used. In this embodiment, interference statistics (e.g. cumulative distribution function with 90–95% outage probability) from on-going calls in each cell as a function of the location of mobile station are collected. The cell area (or any other type of area) is divided into smaller areas from where the statistics are collected. The values collected for the statistics can be based on the actual interference level reported by the mobile station or can be based on received bit error rate as a function of received signal level which can be mapped to interference and stored. Each time there is a channel allocation, i.e., during handoff or call setup, the C/I (carrier to interference) value can be estimated from the mobile station measurement report (which provide the value for C) and the mobile station location and interference statistics (which provide the value of I).

The estimated C/I value can be then mapped to throughput per timeslot. The number of available timeslots is taken into account when maximum throughput value is defined.

If the mobile station location cannot be provided, the interference statistics can be collected as a function of path loss (the received level of the signal from the base station gives a measure of the cell radius and an indication of the location of the mobile station within the cell). This may not be as accurate as location based statistics, but can provide more accurate estimates than single average statistics over the whole cell range.

Similar statistics could be collected for uplink direction as well.

Single statistics of interference, C/I or throughput can be collected for the entire cell. This is not very accurate, since the interference is not the same over the cell area, and it does not take into account interference variation. By adding more accuracy, more processing power and signalling is needed.

FIG. 12 shows the procedure of collecting interference statistics as function of mobile station location. As can be seen, the cell 100 is subdivided into a plurality of smaller areas 102. For each of these areas the carrier to interference ratio is calculated by using the mobile station measurement report to provide C and the mobile station location and mobile station measurement report statistics to provide I. If the C/I statistics per geographical area is collected then the C/I value for a new connection is only a function of MS location and not current measured value (C)

For each small areas having coordinates (X and Y) interference (I) (or C/I statistics) statistics are collected and 90–95% value of the statistics (curves 110 in FIG. 12) is stored in the table (x vs. y)

Reference is made to FIG. 13 which shows the procedure for collecting interference statistics as function Rx_level (pathloss). In this embodiment, the cell is divided up into a plurality of ring like regions at respective distances from the base station. In this embodiment the carrier to interference ratio is calculated. The carrier is calculated as described in relation to the previous figure. The interference value is calculated from the function of the pathloss in the air interface.

Reference is made again to FIG. 9 which shows how the carrier to interference ratios are mapped to throughput.

The collection of statistics should be implemented at each base station. Base stations could report interference matrices to the CRRM, which then maps mobile MS measurement reports, mobile station MS location and available timeslots to maximum throughput. Alternatively, the mobile station MS measurement reports can be forwarded to each candidate cell that calculate corresponding throughput values and forwards them to CRRM.

There has to be some forgetting factor (that is filtering the data, for example with an IIR filter: new_stat_value=0.98*old_stat_value+0.02*new_sample) for filtering of collected data, since different interference/load conditions appear during different times of day.

It should be appreciated that one or more of the methods for determining throughput can be used in the same network. Different systems may use different methods. It is possible that the same system may use more than one method of determining throughput.

It should be appreciated that in alternative embodiments of the invention, throughput is not determined but rather other parameters such as load may be determined. Methods similar to those described may be used to determine the parameter in question.

A method embodying the present invention will now be described.

Figure 15:
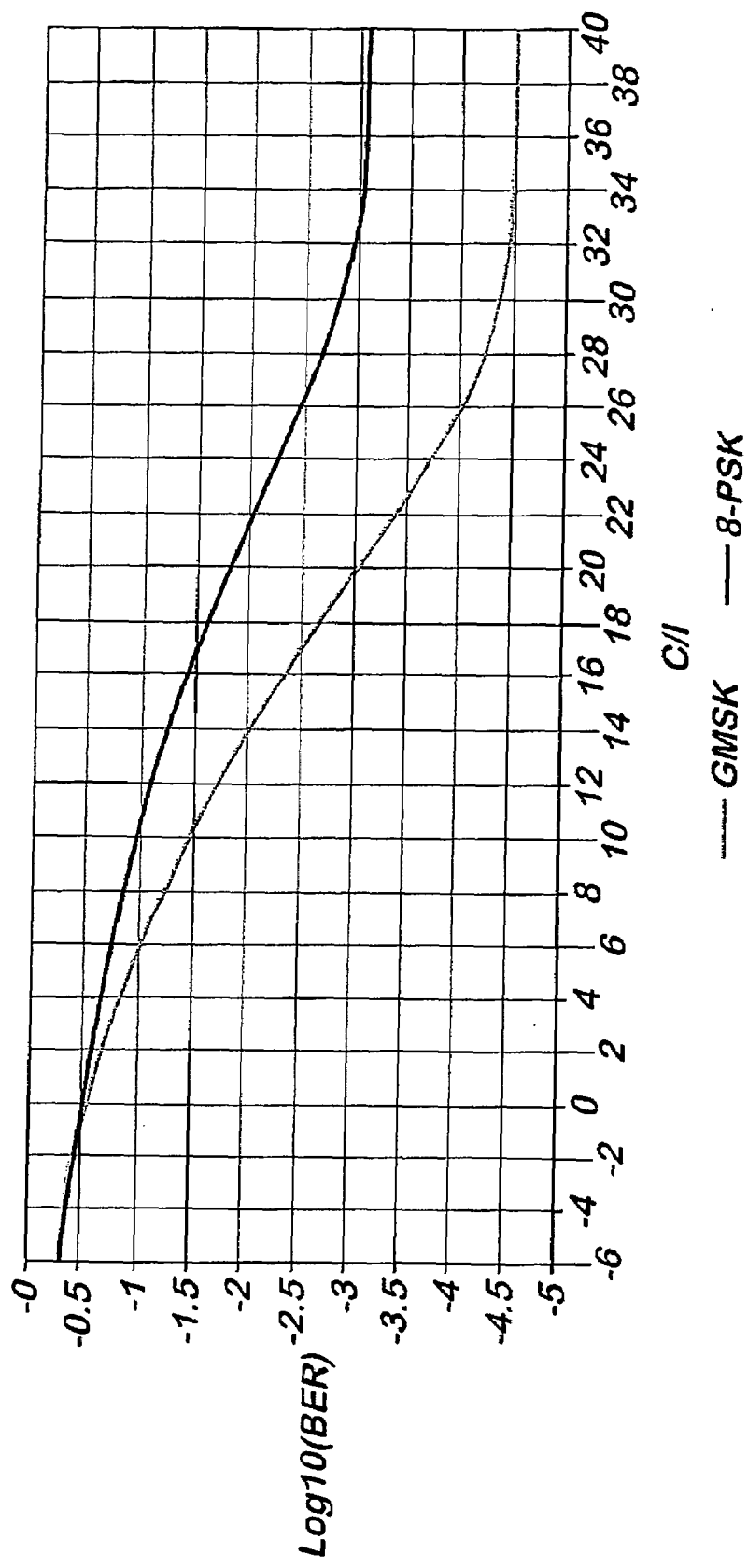
FIG. 15 shows a graph of bit error rate as a function of carrier to interference ratio.

The calculation of signal-to-interference ratio (SIR) can be either cell or connection based. The connection based estimation can require quite significant amount of signalling since it is needed to perform for each allocation (handover, call setup). Cell based estimation, on the other hand, requires only one single (or more In some embodiments of the present invention) statistics for each cell, which can be reported to CRRM along with other periodical reporting such as load. Connection based throughput/SIR estimate may be calculated as follows:

Centralised throughput calculation based on DFCA:
Distributed throughput calculation based on DFCA:
Throughput calculation based on BEP(Bit error probability) and/or C/I statistics and knowledge of the mobile station MS location:
The statistical method used in the cells may be as follows:
Collect BEP values from the measurement reports of each on-going call in each GSM/GERAN cell
Map them to C/I values (FIG. 15) and add power control difference (Max Tx power–actual Tx power) to C/I value. Without DL power control, the BEP pairs (MEAN_BEP, CV_BEP) could be directly mapped to throughput/TSL according to Table 1 (which is included hereinafter).
Add the values to C/I statistics
Report 90–95% value of the C/I statistics to CRRM periodically.

In CRRM C/I statistics of each cells can be mapped to throughput/TSL using for example Table 1 (directly C/I to the Throughput table) depending the capability of the cell. For an EDGE capable cell a different mapping table must be used for GMSK-only capable cell. If all the cells had same capabilities (e.g. EDGE) the cell statistics could be collected directly from individual BEP to provide the throughput/TSL values.

If the proportion of high bit rate users is high in the cell it would seem much more attractive than one cell with a majority of low bit rate users, and vice versa. This could be solved by collecting the statistics for a set of traffic classes and reporting those different values to the CRRM separately, or weight the statistics in proportion to the user distribution.

Also a benchmark service could be used for statistics purpose. For example, only measurements from AMR 12.2 kbit/s users could be collected in statistics.

It has been assumed that this kind of reporting is not needed from WCDMA cells. However in some embodiments of the invention, this type of reporting may be used with CDMA cells.

TABLE 1 throughput in kbps as a function of average BEP (optimum MCS assumed)

| MEAN BEP | GMSK Range of log10 (actual BEP) | 8PSK Range of log10 (actual BEP) | CV_BEP | | | | | | | |
|---|---|---|---|---|---|---|---|---|---|---|
| | | | 0 | 1 | 2 | 3 | 4 | 5 | 6 | 7 |
| 0 | >−0.60 | >−0.60 | 0.0 | 0.0 | 0.0 | 0.0 | 0.0 | 0.0 | 3.4 | 2.4 |
| 1 | −0.70−−0.60 | −0.64−−0.60 | 0.0 | 0.0 | 0.0 | 0.0 | 0.0 | 8.8 | 6.4 | 5.6 |
| 2 | −0.80−−0.70 | −0.68−−0.64 | 0.0 | 0.0 | 0.0 | 0.0 | 0.0 | 11.0 | 8.8 | 8.5 |
| 3 | −0.90−−0.80 | −0.72−−0.68 | 0.0 | 0.0 | 0.0 | 0.0 | 15.7 | 13.0 | 11.6 | 10.9 |
| 4 | −1.00−−0.90 | −0.76−−0.72 | 0.0 | 0.0 | 0.0 | 0.0 | 17.7 | 15.0 | 14.1 | 13.6 |
| 5 | −1.10−−1.00 | −0.80−−0.76 | 0.0 | 0.0 | 0.0 | 21.6 | 19.1 | 17.1 | 16.1 | 16.1 |
| 6 | −1.20−−1.10 | −0.84−−0.80 | 0.0 | 0.0 | 26.3 | 22.4 | 20.9 | 19.0 | 17.9 | 18.0 |
| 7 | −1.30−−1.20 | −0.88−−0.84 | 0.0 | 0.0 | 27.3 | 23.3 | 22.4 | 21.0 | 19.7 | 19.5 |
| 8 | −1.40−−1.30 | −0.92−−0.88 | 0.0 | 29.5 | 28.3 | 24.8 | 23.4 | 22.6 | 21.4 | 20.9 |
| 9 | −1.50−−1.40 | −0.96−−0.92 | 33.2 | 29.5 | 28.9 | 26.8 | 24.1 | 23.9 | 23.1 | 22.6 |
| 10 | −1.60−−1.50 | −1.00−−0.96 | 34.1 | 29.5 | 29.2 | 27.9 | 26.1 | 24.8 | 24.8 | 24.6 |
| 11 | −1.70−−1.60 | −1.04−−1.00 | 34.8 | 29.5 | 29.4 | 28.7 | 27.8 | 26.7 | 26.4 | 26.4 |
| 12 | −1.80−−1.70 | −1.08−−1.04 | 36.0 | 29.6 | 29.5 | 29.1 | 28.5 | 27.9 | 27.7 | 27.9 |
| 13 | −1.90−−1.80 | −1.12−−1.08 | 36.4 | 29.6 | 29.5 | 29.4 | 29.1 | 28.7 | 28.5 | 28.7 |
| 14 | −2.00−−1.90 | −1.16−−1.12 | 36.7 | 29.6 | 29.6 | 29.4 | 29.4 | 29.2 | 29.2 | 29.1 |
| 15 | −2.10−−2.00 | −1.20−−1.16 | 37.4 | 29.9 | 29.6 | 29.6 | 29.5 | 29.4 | 29.4 | 29.3 |
| 16 | −2.20−−2.10 | −1.36−−1.20 | 41.8 | 36.2 | 32.1 | 29.7 | 29.6 | 29.6 | 29.6 | 29.6 |
| 17 | −2.30−−2.20 | −1.52−−1.36 | 44.3 | 42.8 | 41.2 | 39.7 | 38.1 | 36.7 | 36.7 | 36.7 |
| 18 | −2.40−−2.30 | −1.68−−1.52 | 44.7 | 44.5 | 44.0 | 43.6 | 43.2 | 42.9 | 42.6 | 42.5 |
| 19 | −2.50−−2.40 | −1.84−−1.68 | 44.8 | 44.7 | 44.7 | 44.5 | 44.5 | 44.4 | 44.3 | 44.2 |
| 20 | −2.60−−2.50 | −2.00−−1.84 | 44.8 | 44.8 | 44.7 | 44.7 | 44.7 | 44.7 | 44.7 | 44.7 |
| 21 | −2.70−−2.60 | −2.16−−2.00 | 44.8 | 44.8 | 44.8 | 44.8 | 44.8 | 44.8 | 44.8 | 44.8 |
| 22 | −2.80−−2.70 | −2.32−−2.16 | 46.0 | 46.0 | 45.9 | 46.3 | 46.3 | 45.8 | 45.7 | 45.8 |
| 23 | −2.90−−2.80 | −2.48−−2.32 | 48.9 | 49.2 | 49.3 | 49.4 | 49.4 | 49.5 | 49.6 | 49.5 |
| 24 | −3.00−−2.90 | −2.64−−2.48 | 51.3 | 51.3 | 51.7 | 51.6 | 52.1 | 51.8 | 52.0 | 52.1 |
| 25 | −3.10−−3.00 | −2.80−−2.64 | 52.8 | 53.0 | 53.0 | 53.2 | 53.0 | 52.9 | 53.1 | 53.2 |
| 26 | −3.20−−3.10 | −2.96−−2.80 | 53.7 | 53.8 | 53.7 | 53.8 | 54.5 | 54.3 | 54.0 | 53.9 |
| 27 | −3.30−−3.20 | −3.12−−2.96 | 55.8 | 56.1 | 56.2 | 56.1 | 56.2 | 56.2 | 56.2 | 56.6 |
| 28 | −3.40−−3.30 | −3.28−−3.12 | 57.2 | 57.3 | 57.2 | 57.5 | 57.4 | 57.4 | 57.7 | 57.5 |
| 29 | −3.50−−3.40 | −3.44−−3.28 | 58.1 | 57.9 | 58.1 | 58.3 | 58.3 | 58.3 | 58.4 | 58.3 |
| 30 | −3.60−−3.50 | −3.60−−3.44 | 58.7 | 58.6 | 58.6 | 58.8 | 58.8 | 58.8 | 58.8 | 58.8 |
| 31 | <−3.60 | <−3.60 | 58.9 | 58.8 | 58.8 | 58.9 | 58.8 | 58.9 | 58.9 | 59.0 |

The invention claimed is:

1. A method for use in a network covering a region, said region comprising a plurality of areas, a user being assigned to at least one of said areas and having associated therewith a plurality of candidate areas to which the user may be assigned, said method comprising the steps of:
   receiving information identifying said plurality of candidate areas;
   receiving information about a status of resources in said candidate areas;
   based on said information about the status of resources, estimating for each candidate area a parameter, said parameter assuming that said user is assigned to said candidate area; and
   prioritising said plurality of candidate areas which takes into account the estimated value of said parameter.

2. A method as claimed in claim 1, wherein said parameter comprises the total load and/or increase in load in said candidate area.

3. A method as claimed in claim 1, wherein said parameter comprises throughput.

4. A method as claimed in claim 1, wherein said prioritising and/or estimating step takes into account the current traffic load in a candidate area.

5. A method as claimed in claim 4, wherein said current traffic load comprises a real time load, a non real time load and/or a total load.

6. A method as claimed in claim 1, wherein said prioritising and/or estimating step takes into account the interference status of a candidate area.

7. A method as claimed in claim 1, wherein said prioritising and/or estimating step takes into account the status of one or more entities in said network.

8. A method as claimed in claim 1, wherein said prioritising and/or estimating step takes into account configuration information relating to a candidate area.

9. A method as claimed in claim 1, wherein said prioritising and/or estimating step takes into account handover margins between different areas.

10. A method as claimed in claim 1, wherein said prioritising and/or estimating step takes into account a parameter indicative of signal strength and/or link quality.

11. A method as claimed in claim 1, wherein said prioritising and/or estimating step takes into account the quality of service requirements of said user.

12. A method as claimed in claim 1, wherein said prioritising and/or estimating step takes into account the traffic class or classes associated with said user.

13. A method as claimed in claim 1, wherein said prioritising and/or estimating step takes into account parameters associated with said user.

14. A method as claimed in claim 1, wherein said prioritising and/or estimating step takes into account the measurements made by said user relating to one or more of said candidate areas.

15. A method as claimed in claim 14, wherein said measurements comprise the strength of signals received form at least some of said candidate areas.

16. A method as claimed in claim 1, wherein said prioritising and estimating step takes into account information relating to channel allocation in at least some of said candidate areas.

17. A method as claimed in claim 1, wherein said estimating and/or prioritising step(s) are arranged to determine a required maximum power for each candidate cell.

18. A method as claimed in claim 17, wherein said maximum power is determined by an admission control algorithm.

19. A method as claimed in claim 1, wherein said candidate areas include the area to which the user is currently assigned.

20. A method as claimed in claim 1, wherein said user comprises a mobile station.

21. A method as claimed in claim 1 wherein said areas comprise cells.

22. A method as claimed in claim 1 wherein said network comprises a plurality of systems.

23. A method as claimed in claim 22, wherein at least two of said systems use different radio access methods and/or radio interfaces.

24. A method as claimed in claim 22, wherein at least two of said systems overlap at least partially.

25. A method as claimed in claim 1 wherein the estimation and assignment steps are done in a centralised entity.

26. A method as claimed in claim 1, wherein said estimation and assignment steps are done by a plurality of different entities.

27. A method as claimed in claim 26, wherein said plurality of different entities comprise entities in said different systems.

28. A method for use in a network covering a region, said region comprising a plurality of areas, a user being assigned to at least one of said areas and having associated therewith a plurality of candidate areas to which the user may be assigned, said method comprising the steps of:
receiving information identifying said plurality of candidate areas;
estimating for each candidate area a parameter, said parameter assuming that said user is assigned to said candidate area; and
prioritising said plurality of candidate areas which takes into account the estimated value of said parameter;
wherein in said estimating and/or prioritising step(s) a carrier to interference ratio is calculated for at least some time slots associated with at least one of said candidate areas.

29. A method as claimed in claim 28, wherein said carrier to interference ratio is calculated using dynamic frequency and channel allocation algorithm.

30. A method as claimed in claim 28, wherein background interference values are used to determine said carrier to interference ratio.

31. A method as claimed in claim 28, wherein said carrier to interference ratios are mapped to corresponding throughput values.

32. A method as claimed in claim 28, wherein said carrier to interference ratios and a measure of available time slots is used to provide throughput, said parameter comprising throughput.

33. A method as claimed in claim 28, wherein said carrier to interference ratio is calculated by said candidate areas.

34. A method for use in a network covering a region, said region comprising a plurality of areas, a user being assigned to at least one of said areas and having associated therewith a plurality of candidate areas to which the user may be assigned, said method comprising the steps of:
receiving information identifying said plurality of candidate areas;
estimating for each candidate area a parameter, said parameter assuming that said user is assigned to said candidate area; and
prioritising said plurality of candidate areas which takes into account the estimated value of said parameter;
wherein in said estimating and/or prioritising step(s), a number of channels or transceivers used for a given frequency and/or time slot is determined.

35. A method for use in a network covering a region, said region comprising a plurality of areas, a user being assigned to at least one of said areas and having associated therewith a plurality of candidate areas to which the user may be assigned, said method comprising the steps of:
receiving information identifying said plurality of candidate areas;
estimating for each candidate area a parameter, said parameter assuming that said user is assigned to said candidate area; and
prioritising said plurality of candidate areas which takes into account the estimated value of said parameter;
wherein in said estimating and/or prioritising step(s), the number of channels or transceivers in at least one candidate cell is determined.

36. A method for use in a network covering a region, said region comprising a plurality of areas, a user being assigned to at least one of said areas and having associated therewith a plurality of candidate areas to which the user may be assigned, said method comprising the steps of:
receiving information identifying said plurality of candidate areas;
estimating for each candidate area a parameter, said parameter assuming that said user is assigned to said candidate area; and
prioritising said plurality of candidate areas which takes into account the estimated value of said parameter;
wherein said area with which said user is associated is divided into a plurality of smaller areas and information relating to each of said smaller areas is used in said estimating and/or prioritising step.

37. A method as claimed in claim 36, wherein said information is collected as a function of user position.

38. A method as claimed in claim 36, wherein said information is collected as a function of pathloss.

39. A method for use in a network covering a region, said region comprising a plurality of areas, a user being assigned to at least one of said areas and having associated therewith a plurality of candidate areas to which the user may be assigned, said method comprising the steps of:
receiving information identifying said plurality of candidate areas;

estimating for each candidate area a parameter, said parameter assuming that said user is assigned to said candidate area; and prioritising said plurality of candidate areas which takes into account the estimated value of said parameter;

wherein said estimating and/or prioritising step(s) are arranged to determine a required maximum power for each candidate cell, and wherein measurements provided by the user is used with said required maximum power to determine available throughput for a candidate area.

40. A radio resource manager for use in a network covering a region, said region comprising a plurality of areas, a user being assigned to at least one of said areas and having associated therewith a plurality of candidate areas to which the user may be assigned, said radio resource manager comprising:

means for receiving information identifying said plurality of candidate areas and information about a status of resources in said areas;

means for estimating for each candidate area, based on said information about the status of resources, a parameter, said parameter assuming that said user is assigned to said candidate area; and means for prioritising said plurality of candidate areas which takes into account the estimated value of said parameter.

41. A manager as claimed in claim 40, wherein said receiving means, estimating means and prioritising means are provided in a single entity.

42. A manager as claimed in claim 40, wherein a plurality of said entities are provided.

43. A manager as claimed in claim 42, wherein at least two of said entities are arranged to be connected.

44. A manager as claimed in claim 40, wherein said receiving means, estimating means and prioritising means are provided by a plurality of different entities.

45. A radio resource manager for use in a network covering a region, said region comprising a plurality of areas, a user being assigned to at least one of said areas and having associated therewith a plurality of candidate areas to which the user may be assigned, said radio resource manager comprising:

a receiver configured to receive information identifying said plurality of candidate areas and configured to receive information about a status of resources in said areas;

an estimator configured to estimate, for each candidate area, based on said information about the status of resources, a parameter, said parameter assuming that said user is assigned to said candidate area; and a prioritisor configured to prioritise said plurality of candidate areas which takes into account the estimated value of said parameter.

46. A computer program, embodied on a machine readable medium, the computer program comprising a method for use in a network covering a region, said region comprising a plurality of areas, a user being assigned to at least one of said areas and having associated therewith a plurality of candidate areas to which the user may be assigned, wherein, when run on a computer, said computer program is configured to perform the following steps:

receiving information identifying said plurality of candidate areas;

receiving information about a status of resources in said candidate areas;

based on said information about the status of resources, estimating for each candidate area a parameter, said parameter assuming that said user is assigned to said candidate area; and prioritising said plurality of candidate areas which takes into account the estimated value of said parameter.

* * * * *

UNITED STATES PATENT AND TRADEMARK OFFICE
CERTIFICATE OF CORRECTION

PATENT NO.         : 7,072,663 B2                                                     Page 1 of 1
APPLICATION NO. : 10/398739
DATED              : July 4, 2006
INVENTOR(S)        : Ramos et al.

It is certified that error appears in the above-identified patent and that said Letters Patent is hereby corrected as shown below:

On the Title Page

In Section (30):

The Foreign Application Priority Data should read as follows:

Oct. 9, 2000    (GB).............0024705.6
Nov. 10, 2000   (GB).............0027534.7
Jun. 19, 2001   (GB).............0114965.7
Jun. 20, 2001   (GB).............0115083.8

Signed and Sealed this

Twenty-eighth Day of November, 2006

JON W. DUDAS
*Director of the United States Patent and Trademark Office*